United States Patent [19]
Bridges et al.

[11] 3,897,150
[45] July 29, 1975

[54] SCANNED LASER IMAGING AND RANGING SYSTEM

[75] Inventors: William B. Bridges, Thousand Oaks; William O. Edlun, Pacific Palisades; James C. Hill, Playa Del Rey, all of Calif.

[73] Assignee: Hughes Aircraft Company, Culver City, Calif.

[22] Filed: Apr. 3, 1972

[21] Appl. No.: 240,854

[52] U.S. Cl. .................... 356/5; 178/7.2; 178/7.6; 343/5 CM; 343/6 TV
[51] Int. Cl. .............................................. G01c 3/08
[58] Field of Search .................. 244/3.16; 356/4, 5; 343/17, 6 ND, 6 TV, 5 CM; 178/7.6, 7.2

[56] References Cited
UNITED STATES PATENTS

| | | | |
|---|---|---|---|
| 3,443,870 | 5/1969 | Morgan et al. | 356/5 |
| 3,527,533 | 9/1970 | Hook et al. | 356/5 |
| 3,555,178 | 1/1971 | Humiston et al. | 356/5 |
| 3,644,666 | 2/1972 | Green | 178/7.6 |

*Primary Examiner*—Maynard R. Wilbur
*Assistant Examiner*—S. C. Buczinski
*Attorney, Agent, or Firm*—Paul H. Ware; W. H. MacAllister

[57] ABSTRACT

There is disclosed a scanner laser radar imaging system which simultaneously provides both a terrain reflectivity may in an azimuth-elevation display format and time difference computed range information to one or more selected elements of or targets recognized in the displayed terrain map. This is achieved by transmitting a beam from a continuous wave (c.w.) laser through a scanning transmitter to provide the reflectivity map information and by intermittently and/or selectively pulsing the anode power supply to the laser in order to produce laser output pulses superimposed on the c.w. Means are provided in the receiver for separating the range pulse information from the continuous wave reflectivity mapping or image information for separate utilization thereof. Depending upon the requirements of a particular system utilization, the pulse output may be either at the same wavelength as the continuous wave output, or, if the pulse amplitude and laser configuration are properly chosen, a second color shifted pulse at a second wavelength different from the first or c.w. wavelength may be simultaneously produced only during the discrete pulse intervals in order to facilitate range pulse and image c.w. separation and detection at the receiver. Range to an operator selected target may be measured or range to spaced scene elements may be measured and stored in a computer for processing for on line use in target ranging and/or contour mapping as for obstacle avoidance purposes. Measured values of range may also be used to control the phase lag of an image dissector in the receiver so as to prevent video dropout even with variations in range such as may result in contouring from a moving aircraft.

14 Claims, 18 Drawing Figures

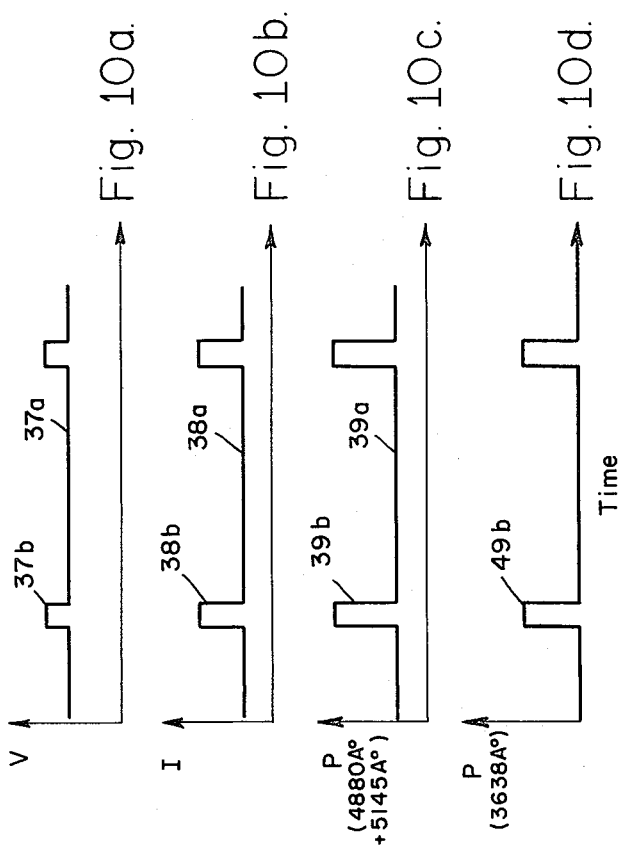
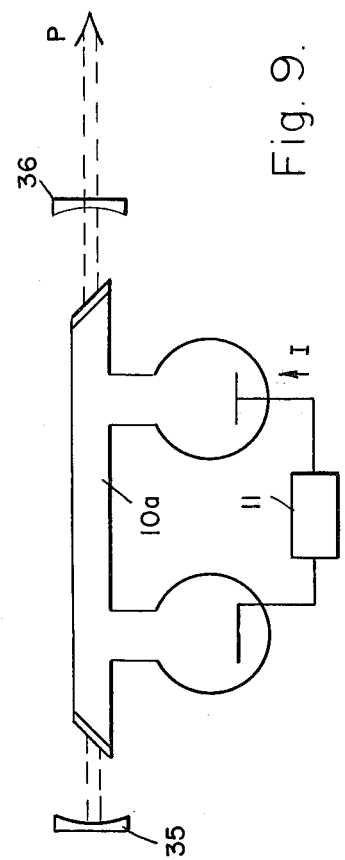
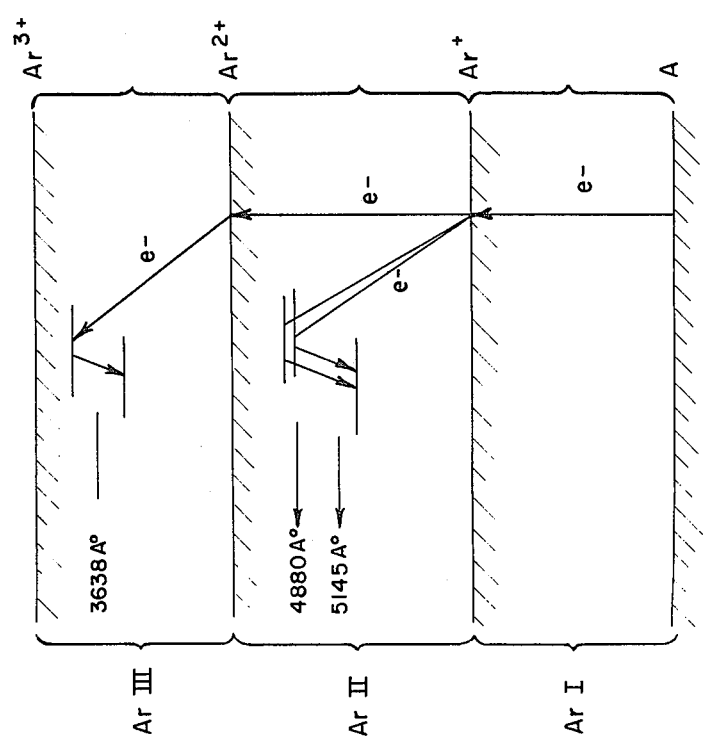
Fig. 10a.
Fig. 10b.
Fig. 10c.
Fig. 10d.
Fig. 9.
Fig. 11.

SCANNED LASER IMAGING AND RANGING SYSTEM

BACKGROUND OF THE INVENTION

1. Field of the Invention

This invention relates generally to scanned laser radar imaging or television systems which may be made and used in several different ways for many applications including, for example, airborne ground mapping and target recognition and ranging systems for weapon or fire control use. In such imaging systems scanning may be accomplished by mechanical means such as two moving mirrors which deflect the output beam of the laser so as to form a timed scan pattern; or by one moving mirror plus translation of the entire system as by positioning it in an aircraft so as to form a strip map; or the same effect may be achieved by electro-optical or other means. The laser beam is preferably passed through an optical transmitter-scanner and is thereby scanned over the object or scene to be viewed. The returned reflections and/or scatter are received by an optical receiver. To form an image either the receiver or the transmitter must be scanned. Often both are scanned in synchronism to provide improved clutter or interference rejection. The received optical signal is then converted to an electrical video signal and this video signal may be recorded and processed or directly displayed by any convenient means such as a cathode ray tube.

Such imaging systems in the past have permitted an operator to use a C type azimuth-elevation map display or image to detect tactical targets for military attack. However, where these sensors have been used in weapon delivery systems, range to the target has heretofore necessarily been computed by other mechanizations or systems. As shown during a long period of development of radar ranging systems, weapon delivery computations using time difference derived range inputs provides maximum weapon delivery accuracy. The present system can derive such inputs from such an imaging system itself for one or a plurality of selected targets since it is capable of providing time difference ranging and range rate by pulsing a continuous wave gas laser and using the pulse to measure range to a target selected from the real-time scene reflected imagery derived from the c.w. output or to generate a contour map of the scene by providing range to incrementally spaced elements of the scene.

2. Prior Art

Fixed direction pulsed microwave radar distance measuring equipment was, of course, developed even prior to the invention of lasers, and such time difference ranging per se has been accomplished at both microwave and laser frequencies. Another known method of measuring distance with microwave and, more recently, with laser radars, is to tone modulate the amplitude of the radar beam by a subcarrier at some frequency $f_m$. The phase of the modulation on the received signal is then recovered and compared to that transmitted in order to compute the range. Usually, three modulation frequencies are used to eliminate redundancy in the range information. Such systems are sold commercially using xenon arcs and have been flown for aerial profiling. (See paper number 2–4, 1967 IEEE Conference on Laser Engineering and Applications, held in Washington, D.C. in 1967, authored by J. Ackerman and G. Dietrich and entitled "An Airborne Laser Terrain Profiling System.") If one attempts to use such a tone modulated range determining system with a scanned imaging system, however, all modulation frequencies have to be higher than the highest video frequency being received so as not to interfere with the imaging. For example, if the video bandwidth of such a system extends to 100 MHz then the modulation has to be at $f_m > 200$ MHz so as not to disturb the video. This requires the addition of an expensive electro-optical modulator capable of handling such high frequencies, and also requires that the receiver bandwidth extend up into this range. For receivers using sensitive photomultipliers or image dissector tubes this requirement proves quite difficult to meet.

Pulsed microwave and laser radar ranging systems have, of course, also been heretofore used to measure distances to targets which are imaged and/or acquired by systems other than the laser ranging system itself. In addition to the cost and complexity factors involved in supplementary systems and, when airborne, to the weight disadvantages of such supplementary systems, this approach also fails to provide mechanized coordination between or correlation of the space-time coordinates of the visual image of a target to be selected and the direction of ranging pulses to the target selected. This coordination is achieved in principle by pulsed P.P.I. systems, but image resolution is inadequate for precise tactical use, and the larger beamwidth also precludes low angle scanning. The absence of such coordination in prior art laser mapping systems using an azimuth-elevation coordinate display may result in video dropout or loss of synchronization. It always imposes a severe requirement on operator response capability and increases the required operator response time.

SUMMARY OF THE INVENTION

It is an object of this invention to overcome these difficulties of the prior art by providing a system which utilizes simultaneous pulse and continuous wave operation of a laser to obtain time difference range and range rate resolved to an accuracy of a few feet of slant range to selected targets, terrain, or obstructions within the field of view of a continuously raster or line scanned laser electro-opto-mechanical high resolution imaging device. While the imaging sensor is being utilized to detect targets on a real-time television type display generated by processing image signals derived from the energy returned from the continuous wave output of the laser, range can either be measured to an operator selected target for the purposes of weapons delivery computations or range can be measured at pre-established azimuth and range increments to provide terrain or obstacle contour data for contour map display for operator information or target selection or for automatic obstacle avoidance systems. If desired, the techniques disclosed herein can also be employed to obtain range within the field of view of laser line scanning devices. The imaging sensor may initially be phase synchronized either from approximate values of range known from the systems or estimated, or from initially measured values of range-only operation of this system.

One method of obtaining a raster scan for the laser beam consists of rotating a multi-faceted mirror wheel to form a slow horizontal or flight-path-orthogonal scan of the raster scan pattern. Another multi-faceted mirror wheel is rotated preferably by step-up gearing from the first to form a fast vertical or along-flight-path scan. Synchronization pulses are derived from the rotating mirrors through a photodetector to provide at least one sync pulse at the start of each vertical scan. If required by system utilization, counters may be triggered by these pulses to provide any desired number of incremental sync pulses per scan. The time of start of any horizontal or vertical scan is thus known through the use of such sync pulses. Video derived by the laser sensor may be displayed to an operator on a non-flickering, real time cathode ray tube display having a raster sweep which corresponds in angular field of view with and which is frequency synchronized with the transmitter scan. The display image is, of course, phase delayed with respect to the transmitter scan to allow for round trip light transit time. Measurement of elapsed time within a raster frame will thus define azimuth and elevation spatial coordinates within both the scene scanned and the video display which are related in a known fashion to the pointing angles of the central axis or boresight of the laser transmitter telescope.

In one embodiment, a range pulse is generated at any operator selected azimuth and elevation (as by light pen sampling of CRT deflection voltages) to initiate time difference ranging to a desired imaged target by triggering a pulser to supply an incremental voltage pulse to the laser power supply at the preselected time. In this embodiment an argon laser was used to generate range pulses by pulse modulation of the amplitude of the laser anode current. Laser pulses of one microsecond duration at a pulse repetition frequency of as much as 1000 Hz and a peak power more than five times the argon laser's c.w. level when operating at 4 watts were readily obtained. In this exemplary embodiment the range pulse return was separated from the image or video signal by reflecting a portion of the light received from the total scene scanned through a partially silvered mirror to a photomultiplier tube the electrical output of which is supplied to a threshhold amplifier circuit having a variable threshhold level which can be adjusted either manually or by feedback to have a threshhold value above the level of light received from c.w. reflection to thereby detect only the return time of the pulse step function. The transmitted light output from the partially silvered mirror is supplied to the image dissector tube of an otherwise conventional laser radar imaging system. A bright spot will appear in the image thus derived at the location of the target being ranged thus indicating positively what part of the image was hit and thereby closing a servo loop to the light pen.

In another embodiment of the system a gas laser is operated in a special mode which can be realized with certain ion lasers. The special mode of laser operation is such that a frequency or color shifted pulse is obtained from a c.w. operating gas laser in addition to and simultaneously with its c.w. output during the pulse interval. In this embodiment the optical receiver for the reflected laser energy is followed by a frequency discriminating beam splitting device such as a dichroic mirror and/or filters to optically separate the two radiant energy frequencies or frequency bands transmitted by the continuous wave and pulse operation of the laser respectively. These optically separated signals are then converted by any suitable transducer to electrical signals which may in turn be used to generate the video and ranging information in the manner discussed above. Of course it will be understood that in either embodiment the range and image signals could, if desired, be separated after transducer conversion by electrical circuit means equivalent to the optical means disclosed herein.

Where it is desired to use the system for terrain contour mapping for presentation together with the reflectivity map either as a switch selectable mode of display or as two simultaneous continuous displays, it is of course necessary to transmit a relatively large plurality of ranging pulses at predetermined time increments within each raster frame rather than to send one or a few ranging pulses to preselected targets. One typical system uses pulses of a few nanoseconds duration transmitted at a rate of 1000 or more pulses per second. The loss of the reflectivity mapping video information which results from the amplitude pulsing of the transmitter can then be compensated for and accurate continuous reflectivity mapping achieved by deriving from the pulse received at ranging frequency an electrical timing signal which is used during reception thereof to reduce the gain of the video amplifier to which the continuous wave reflectivity mapping signal is fed by the same ratio by which the laser anode voltage was increased during transmission of the pulse. That is to say, if the laser power output is increased by a factor of 5 to 1 during range pulsing transmission and if the reflected range signal is used to reduce the gain of the amplifier for the reflected mapping signal by the same factor of 5 to 1 only during reception of the ranging pulse, then the lost video will in effect be restored and a continuously accurate reflectivity map can be presented simultaneously with a terrain contour sampled map over the entire area of the scene scanned. If desired, means can be provided to simultaneously present a digital readout of range to any point or target identified or operator selected on the reflectivity or contour maps so generated. Video fidelity and stability can also be improved by using the separately measured range information to phase synchronize the image dissector.

It will be understood that either the single color or color shifted laser outputs can be used for either the operator selected single target system mode or the terrain contour mapping system mode to be described. For convenience, however, a first embodiment using a single color pulse to range to a single operator selected target and a second embodiment using a plurality of color shifted pulses for terrain contouring will be described. In practice, both may be included as switch selected modes in a single equipment.

BRIEF DESCRIPTION OF THE DRAWINGS

These and other objectives and advantages of the invention will be more fully understood from the detailed description of the preferred embodiments given below when taken in conjunction with the drawings attached hereto wherein like figures refer to like parts throughout and in which:

FIG. 9 is a diagrammatic illustration of a laser configuration used in the second embodiment of the invention.

FIGS. 10a, 10b, 10c, and 10d are graphs illustrating certain voltage, current, and power relationships involved in the operation of the laser of FIG. 9.

FIG. 11 is an energy level diagram further illustrating the operation of the laser of FIG. 9.

DESCRIPTION OF THE PREFERRED EMBODIMENTS

Figure 1:
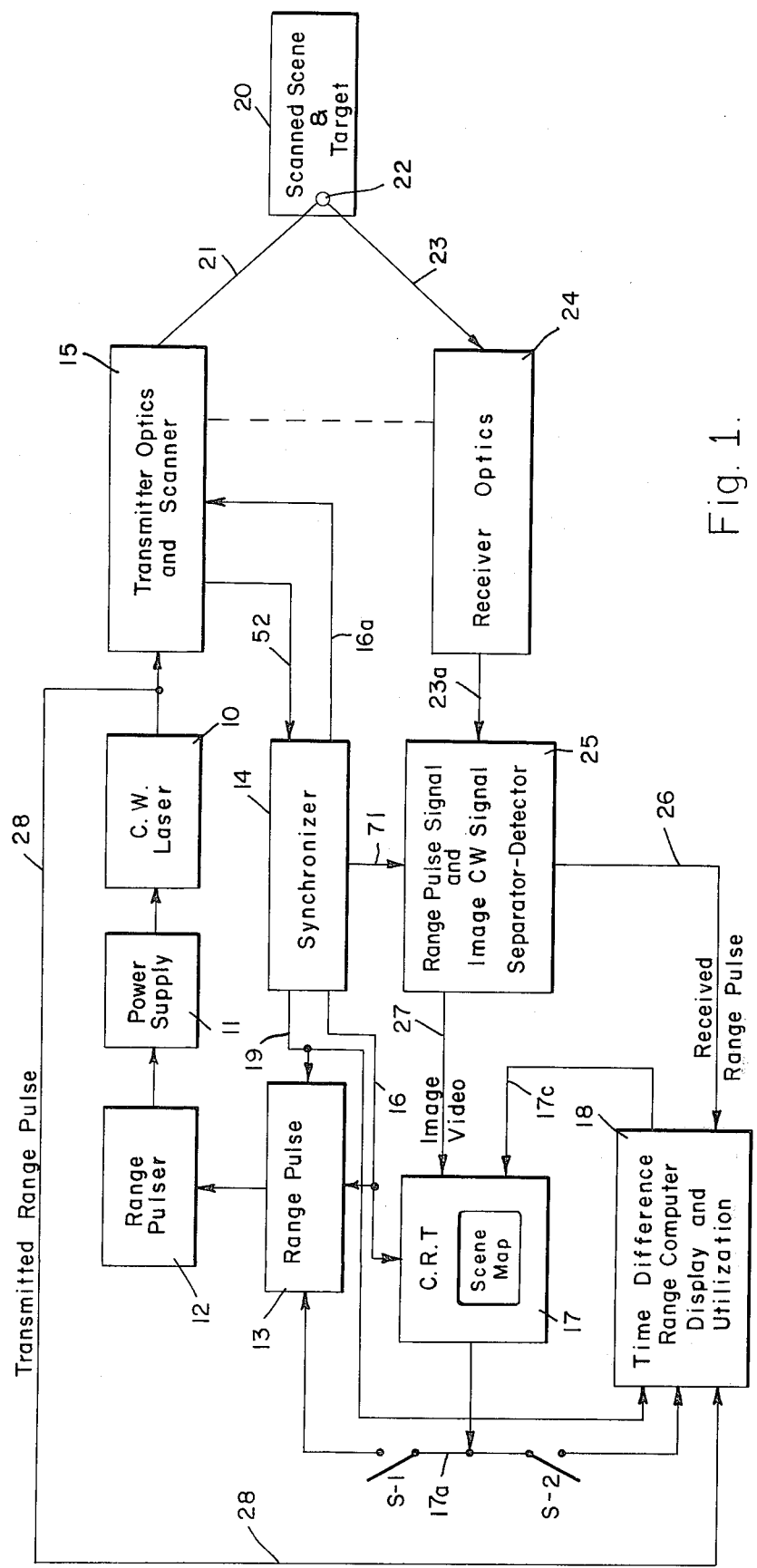
FIG. 1 is a block diagram of the basic system of the present invention and is applicable to both embodiments.

Turning now to the drawings, there is shown in FIG. 1 a generalized block diagram of the system of the present invention illustrating features which are common to both of the preferred embodiments to be discussed in detail herein. These common features, together with details of the first embodiment will be described first. Thus, in FIG. 1 there is shown a laser 10 which may be any type of gas laser capable of providing a continuous wave radiant energy output of a wavelength suitable to the needs of the particular application for which the system is intended. Depending upon the gas used in laser 10, its output may be in the infra-red, the visible, or the ultra violet region of the spectrum. The choice depends upon application requirements as to atmospheric penetration, range, power requirements, nature of target and the like. The choice is restricted only by the availability of transmitter scanning devices useable with the wavelength chosen.

One laser which is suitable for many such applications is an argon laser. When operated with 4 watts continuous wave output, the output wavelength of such a laser is primarily in the ArII 4880A and 5145A lines at 25 amperes average discharge current. When pulses of several hundred volts and 0.5 microseconds duration are added to the steady state anode voltage supply, 22.4 watt output pulses are obtained from the laser having 1 microsecond duration at the same wave lengths and are suitable for use in the first embodiment of this system. More generally, laser pulses having a peak power more than five times the steady state continuous wave output power of such a laser can be obtained for one microsecond pulse duration at a pulse repetition frequency of at least one or two thousand pulses per second with a stable pulse shape with no reduction in laser life. Such pulses, in which only the varied amplitude of the output is utilized, are used in the first embodiment of the system.

However, a modified mode of operation of such a laser is useful in the second embodiment of the system. At the higher current levels occurring during the pulse, the higher ionization states of the laser gas are also populated and if suitable mirror systems (to be described below) are added to the laser sufficient gain is available to cause the ArIII lines to oscillate; particularly the ArIII 3638A and ArIII 3511A lines. These lines have an excitation threshhold of approximately 30 to 35 amperes in continuous wave operation of an argon gas laser. Thus, if appropriate mirrors are used in the laser, that is, mirrors with optimum reflectivities at both 4880A/5145A and 3638A, a pulsed output at 3638A will be obtained in addition to the pulsed continuous wave output at 4880A/5145A. It is of course necessary to design the signal separation and detection circuitry shown at block 25 in FIG. 1 to accommodate the type of laser output transmission which may be most desirable for a particular application. The details of this mode of laser operation used in the second embodiment will be described further below. In the first embodiment of the system we may assume that the laser 10 is a conventional argon gas laser using mirrors such that it is only transmitting at the 4880A/5145A frequency band and is pulsed as noted above.

Figure 2:
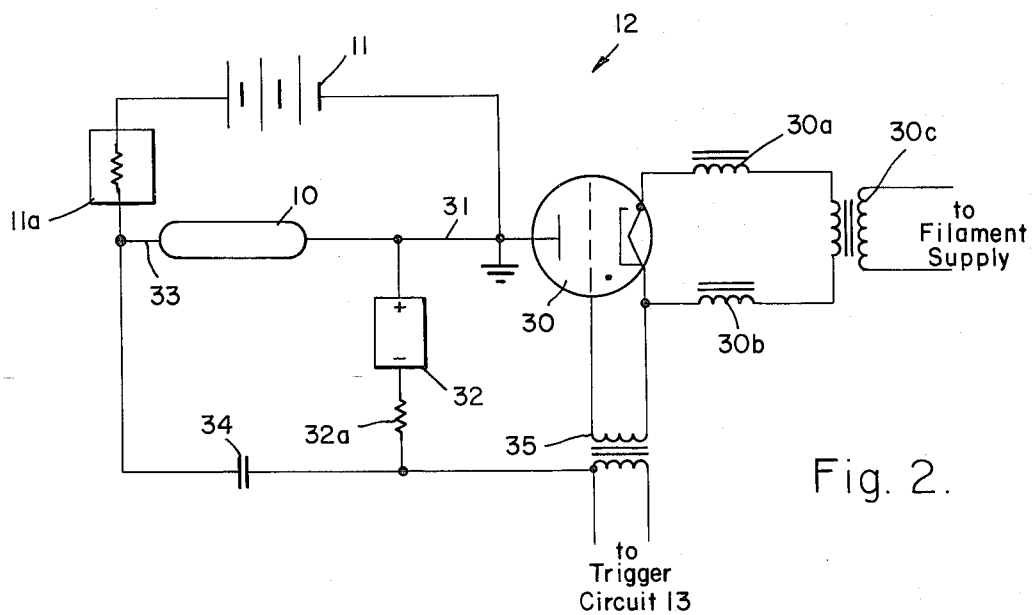
FIG. 2 is a circuit diagram of a pulser circuit which may be used to pulse the laser transmitter shown in FIG. 1 in both embodiments.

The laser 10 is connected to the output of a conventional power supply 11 which supplies electrical power to the anode and cathode of the laser 10 at a predetermined steady state value. This steady state value of the output of power supply 11 may be increased by a range pulser circuit 12 which is operative upon receipt of a trigger pulse from the range pulse trigger control circuit 13 to generate such an increased value. The circuit details of the range pulser 12 and its connection to the trigger control 13 and power supply 11 as used in both embodiments are shown in FIG. 2 and will be discussed below.

Figure 7:
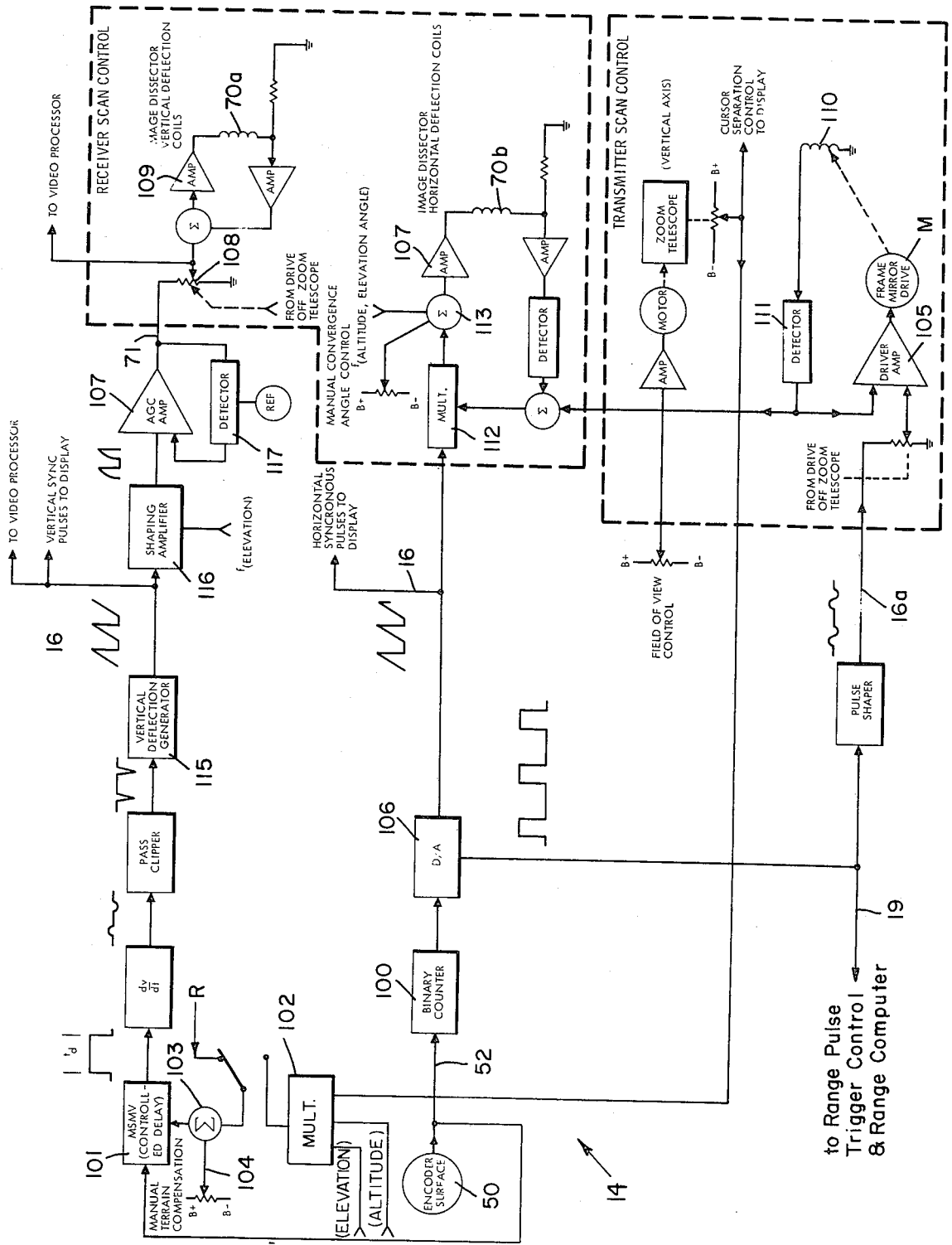
FIG. 7 is a block diagram of circuitry which may be used to provide synchronized transmitter and receiver scan mechanizations and comprises a detailed showing of the essential features of the synchronizer shown in block form in FIG. 1.
Figure 14:
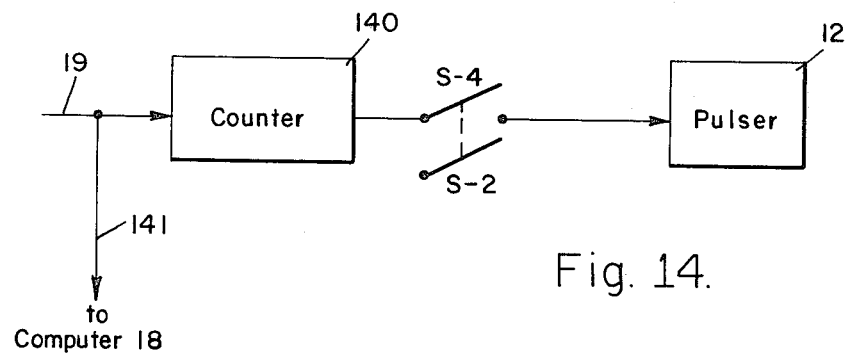
FIG. 14 is a block diagram of a pulse timing control circuit for a contour mapping mode.
Figure 15:
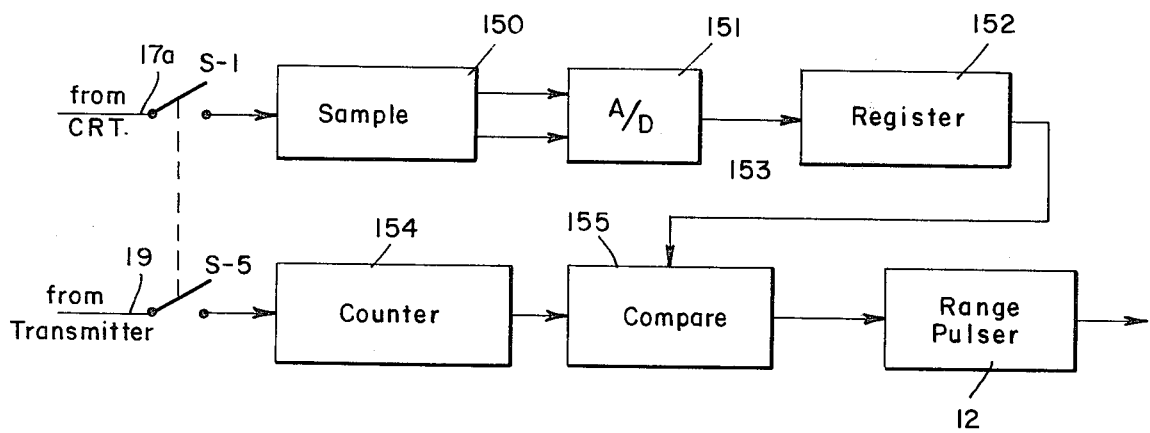
FIG. 15 is a block diagram of a pulse timing control circuit for a single target mode.

The timing of the range pulse trigger control is derived jointly from a synchronizer circuit 14 which supplies timing to and derives timing from the scanner circuit in the transmitter optics and scanner arrangement and from an operator selected circuit in range pulse timing control 13. Details of synchronizer 14 are shown in FIG. 7. Details of range pulse timing circuits are shown in FIGS. 14 and 15.

Figure 3:
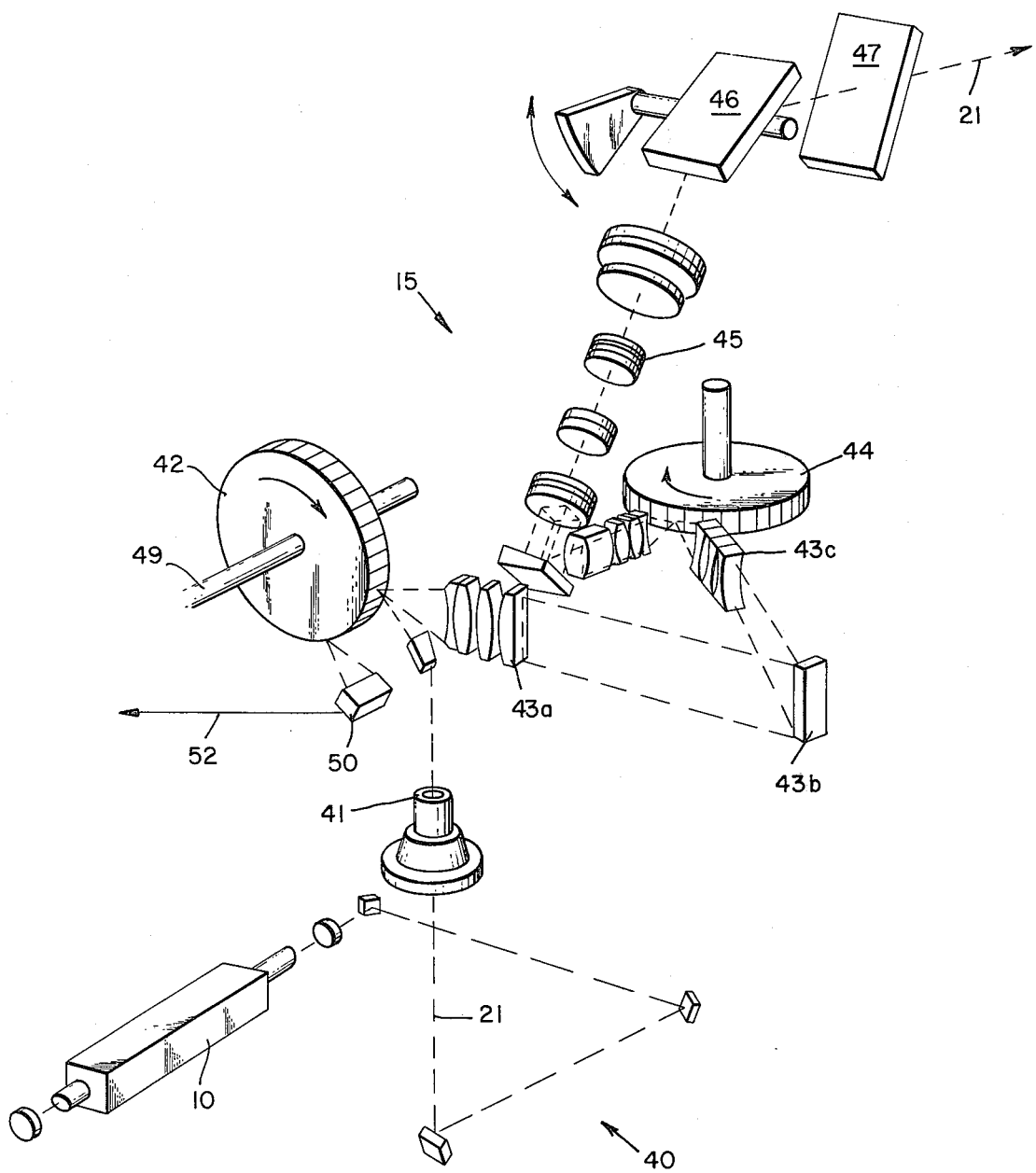
FIG. 3 is a combined perspective and diagrammatic view schematically illustrating the transmitter optical and scanning arrangement for both embodiments of the system of FIG. 1.

A transmitter-scanner 15 suitable for use in both embodiments is shown in detail in FIG. 3. As has been noted above, the transmitter optics and scanner 15 consist broadly of a first vertical scan generating multifaceted mirror wheel 42 rotated at high speed by a step-up gear drive from a second such wheel 44 which generates the horizontal scan and which is rotated by a synchronous motor M driven from the master clock or binary counter 100 in synchronizer 14 as shown in FIGS. 3 and 7. The reflection of the laser beam 21 from the rotating wheel 42 forms the vertical or along-the-flight-path flight-path scan of a raster scan pattern for the light output of laser 10 which is applied as an input to this first mirror. Output from the first mirror is then applied to the second multi-faceted mirror wheel 44 to form the horizontal or flight-path orthogonal scan. Synchronizing pulses may be derived from one or both of these rotating mirror wheels through photodetector encoders at a rate of one sync pulse per scan, or if desired, at any increment thereof. These sync pulses are used to slave counting circuits such as counter 100 in the synchronizer 14 and may also be used directly as synchronizing pulses for other portions of particular systems when applied directly or through suitable logic and control circuitry.

Whatever the required timing details of a particular system may be, it is broadly true that the time of start of any horizontal scan and any vertical scan is known through use of such sync pulses. These sync pulses are used to define or correlate the timing of the firing of the range pulse by trigger control 13 with the coordinates within the scene scan and as clock sync pulses for range computer 18. They are supplied from synchronizer 14 over line 19 to both of their circuits. Outputs are also supplied from synchronizer 14 via cable 16 to the sweep circuits of an image dissector 70 and a cathode ray display tube 17 to generate in both a scan identical in frequency to that of transmitter 15, but with the fast scan of both (here the vertical) delayed in phase. The phase delay is adjusted to allow for light transit time to and from the scene so as to assure optimum positive or image phase synchronization within each raster frame.

The circuit of FIG. 7 provides phase sync and assumes that a gross approximation of slant range from the transmitter to the imaged scene (and hence a sufficient approximation of light transit time for image phase synchronization purposes) may be obtained by triangulation from gimbal instrument readings of the vector direction angles of the boresight of the laser transmitter taken with altitude obtained from a simple radar altimeter reading. These quantities are shown as inputs to multiplexer 102 in FIG. 7. Given vertical height and central or boresight axis direction angles, approximate average slant range can be computed which gives average approximate light transit time to the scene with sufficient accuracy for phase synchronization purposes. A voltage proportional to the delay thus called for is provided as the output of multiplexer 102 in FIG. 7 which is supplied through adder 103 to delay circuit 101. Potentiometer 104 also supplies an input to the adder and may be manually adjusted by the operator so as to produce the clearest picture on display 17 for any point of interest.

Optical output from the transmitter optics and scanner 15 in FIG. 1 is transmitted through a suitable telescope to a scanned scene 20 indicated via transmitted beam 21. Each element such as the element 22 of the scanned scene 20 will reflect a percentage of the transmitted beam 21 to the receiver optics 24 of the system via a reflected beam 23. The intensity of the radiation reflected along beam 23 will of course vary as a function of the intensity of the incident beam 21, of the reflectivity of the particular element 22, and of other well known transmission losses which are substantially constant or standard for all elements in the scanned scene.

The receiver optical system 24 comprises any suitable lens or telescope arrangement boresighted or aligned with the transmitter telescope (as indicated by the dashed line) so as to collect all radiant energy from and form an image of the total scene being scanned. Thus, it collects the light reflected along beam 23 and supplies it as an input to a range pulse signal and continuous wave image signal separator 25. The field of view of the receiver lens is preferably large enough to allow for light transit time delay at design velocities of any aircraft in which a particular system may be intended for use.

Figure 8:
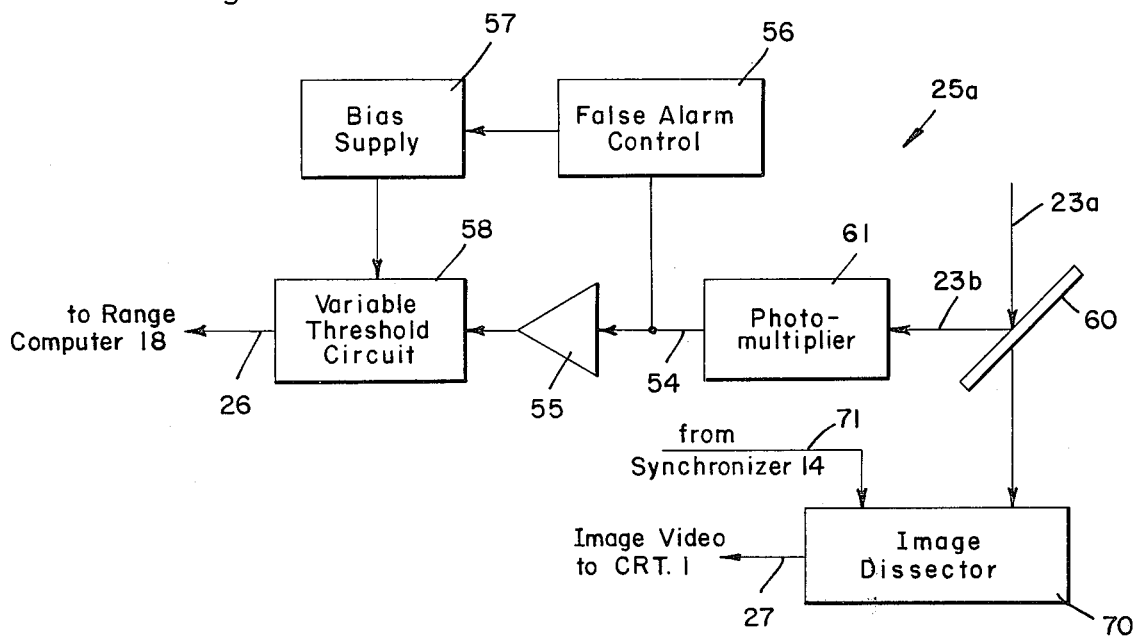
FIG. 8 is a block diagram illustrating the ranging pulse separation and detection arrangement used in the first embodiment of the invention.
Figure 12:
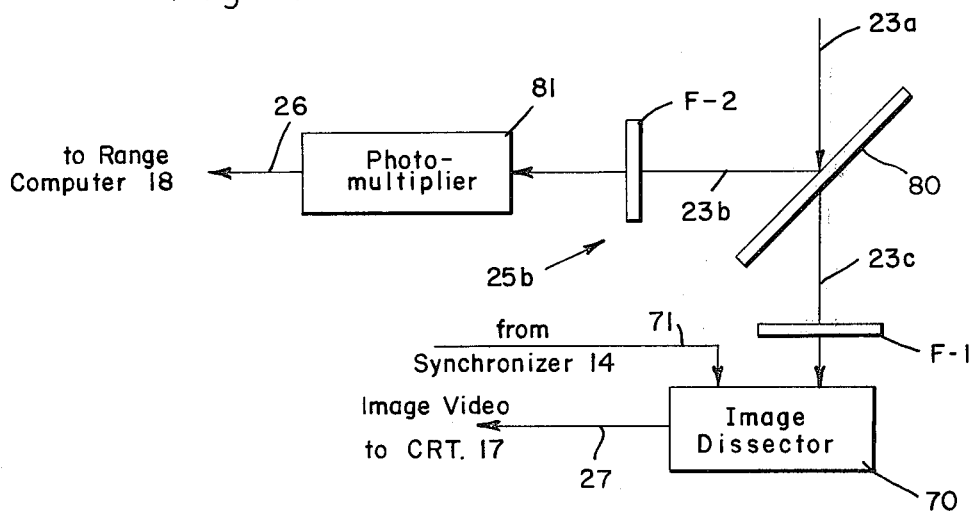
FIG. 12 is a block diagram illustrating a range pulse separation and detection arrangement used in the second embodiment of the invention in place of the circuit of FIG. 8.

The detailed manner of separating the range pulse from the image signal differs in the two embodiments but depends only on what characteristics of the transmitted beam 21 (and hence the reflected beam 23) have been varied. Details of a separation device 25 suitable for use in the first embodiment wherein a pulsed amplitude continuous wave beam at a single frequency is transmitted and reflected are shown in FIG. 8. Details of a separator 25 used in the dual frequency second embodiment are shown in FIG. 12.

It will be noted that output 23a of receiver optics 24 is applied in FIG. 8 to a partially silvered mirror 60 positioned obliquely to the beam 23a so that a portion 23b of beam 23a is reflected into a photomultiplier tube 61 which generates an electrical output signal which is a measure of the total light reflected from all elements of the scanned scene at any instant and which is used to detect the time of reception of the ranging pulse in a manner to be described in detail below. The other portion 23c of beam 23a is transmitted by mirror 60 to an image dissector tube 70 which produces on line 27 a video electrical signal used to modulate the intensity of the electron beam in CRT17. The image dissector and the CRT are synchronously scanned in an azimuth-elevation raster duplicating in form but phase delayed with respect to the transmitter scan as discussed above. The vertical deflection coil 70a and the horizontal deflection coil 70b of image dissector 70 are included in the detailed synchronization circuitry shown in FIG. 7 to more clearly illustrate the operation of the system even though this deflection circuitry per se does not form a part of the present invention.

The video derived by the image detector may thus be displayed to the operator on a non-flickering real time cathode ray tube display. The time of start of any horizontal and/or vertical transmitter scan is coordinated with the corresponding display scan by virtue of the use of the above noted sync pulses. The range pulse may thus be generated at any azimuth and elevation selected by the operator who observes the display to permit him to initiate time difference ranging to a selected imaged target by any convenient mechanization of feedback equivalent to closing a switch S-1 in line 17a to range pulse trigger control 13. This mechanization may, for example, comprise azimuth and elevation cursors on the display electrically connected to CRT deflection voltage sampling circuits and phase difference compensating circuits so that upon operator switch command a range pulse is fired once during each succeeding transmitter raster frame at a time such that it will strike the target seen at the intersection point of the cursors. Alternatively the mechanization may be a light pen held against the display to perform a similar function.

As noted above, approximate range to the target is known from other systems or can be measured in computer 18 on the basis of the return of the first few range pulses (returned as seen in FIG. 8 through photomultiplier 61 which uses a fully open aperture and hence responds to any returned range pulse) with sufficient accuracy to permit synchronizing of the deflection coils in image dissector 70 as shown in FIG. 7 in such a way that its sweep centers its aperature to lag in phase behind the transmitter scan by the amount necessary to allow for this approximate round trip light transit time to the target. As may be seen in FIG. 7, the CRT sweep circuits are phase synchronized to this lagging image dissector sweep. The image dissector preferably uses a relatively wide aperture in the direction of rapid scan (here shown as vertical) and a relatively narrow aperture in the direction of a slow scan (horizontal) in order to minimize noise and background clutter while still retaining image phase synchronization.

For a ranging pulse to strike a displayed target it must therefore be fired in that next transmitter raster frame at a point in time which allows for the phase lag of the transmitter by the CRT by the approximate time to the target as measured above so that the return will be centered in the aperture of the image dissector. A voltage which is a measure of this delay is available at the output of monostable multivibrator 101 in FIG. 7. If desired this voltage can be displayed to permit operator adjustment of the timing of a gate in range pulse control circuit 13 to make the necessary adjustment. Alternatively, automatic positioning may be achieved by circuitry such as shown in FIG. 15 which samples the deflection voltage to obtain a digital number equal to the number of sync pulses which have occured since the start of and compares this number to a running count of the number of sync pulses which occur during the next raster frame of the transmitter. Emitting a trigger pulse when these numbers are equal gives the correct firing time.

This may readily be seen if we note that the phase lag at any given instant is merely a zero offset in the starting time of two separate angle measuring or counting systems, the transmitter scan on the one hand and the synchronized image dissector-CRT scan on the other. The pulse must be fired so that the angle measured has the same absolute value or direction in both systems (even though measured at different times) so that the transmitter will hit what is seen on the CRT. The pulse, of course, is transmitted and reflected along essentially the same straight line.

The time difference computation of actual precise range along this line to the target which was observed and selected is accomplished when the range pulse return signal is received in the range computer 18 via channel 26 and stops counters therein in a manner analogous to radar ranging. The exact actual time of transmission of the ranging pulse is supplied over channel 28 to the time difference range computer 18 by a start pulse which starts the counters. Channel 28 may comprise a fibre optic light pipe feeding back a small sample of the pulse output of the laser 10 which is converted to an electrical signal in the computer 18. For purposes of the present discussion of such target selection and range computation it will be assumed that relative motion of the system and the target is either zero or small enough to be neglected as is true in helicopter borne anti-tank fire control systems. If the accuracy requirements of a particular application demand motion compensation techniques to allow for motion of a vehicle such as an aircraft which is in rapid motion, such compensation can be provided by servo controlling the boresighted transmitter and receiver to remain pointed at a fixed ground target point during ranging on it or by using circuitry in range computer 18 which may be appropriate to other system needs. In any event a precise value of range may thus be determined in digital computer 18 and may be displayed as by simple digital read-out on the CRT17 panel or may be supplied for utilization by any associated weapons delivery or other system.

In the second embodiment of the system noted above wherein a continuous wave output is transmitted at a first wavelength and the laser 10 is pulsed at a level sufficient to generate not only that first wavelength by also a color shifted pulse output of a second wavelength occurring only during the pulse, the range pulse signal and image continuous wave signal separator 25 performs the separation of the signals as shown in FIG. 12 by applying the light received in returned beam 23 to receiver optics 24 and thence via beam 23a to a beam splitter comprising either a partially silvered mirror such as 60 followed by suitable wavelength band pass optical filters for each of the two signals respectively, or, more simply to a dichroic or wavelength selective mirror 80. The two outputs 23b and 23c of either arrangement are then applied to separate photodetectors or other suitable transducers to electrically generate the received range pulse signal for channel 26 by detection of the second or pulsed wavelength and the scene image video signal for channel 27 by detection of the continuous wave signal at the first wavelength. The details of the laser and its operation for this second embodiment will be discussed below in connection with FIGS. 9, 10 and 11 whereas further details of the range pulse signal and image signal separator 25 for this second embodiment of the system will be discussed below in connection with FIG. 12. The above discussed possible utilization of the range pulse signal on channel 26 and image video signal on channel 27 is, however, the same in both embodiments or systems.

For convenience only, the first embodiment has discussed a single operator selected target system activated by closing switch S-1. The second embodiment to be discussed below will be illustrated by a system activated by closing switch S-2 in FIG. 1. which starts a counter running in range pulse trigger control 13 at a harmonic of the scan frequency so that range pulses are continuously generated, and computed values of range continuously stored in memory banks in computer 18. The light pen or cursors in CRT17 then indicate what memory address to read to obtain the desired range.

In the first (S-1) system, a target is first selected and a pulse is thereafter fired at the single selected target. Since the pulsed amplitude is greater than five times that of the continuous wave energy amplitude level, a target encompassed by the laser sensors scanned field of view will reflect a range signal level having a similar ratio of amplitude to the c.w. reflection from the same target and generally from the immediately surrounding scene. The laser is pulse modulated while its beam is directed at the selected target's spatial coordinates. The differential target return amplitude appears as a bright spot on the display and provides a pin-point location within the field of view to indicate what target has been ranged to and to which a missile or guided bomb can effectively home.

In the second (S-2) system, pulses have already been continuously fired throughout the scanned scene at small increments of space. The returned video is displayed and values of range to all sampled points are computed and stored. The coordinates of the target as selected by the operator are then simply used to address the correct memory cell in computer 18 to read out or gate out the desired value of range. Switch S-2 in line 17b of FIG. 1 must be closed to enable this function. Of course, if S-2 is closed, S-1 is open and vice-versa. obviously, if warranted by cost utility considerations, a single system can be provided with both S-1 and S-2 modes.

As noted above, either the single color or dual color embodiment of the invention may be used in either system. For convenience only, the details of the second system will be discussed in connection with the dual color embodiment. It should also be noted, however, that both the single and dual color embodiments may be used in many systems other than either of the two discussed by way of example herein. The specific circuitry to be used for each of the blocks in the block diagram of FIG. 1 will of course vary appropriately with such varied system requirements.

In systems or applications where back scattering of light by the atmosphere may create noise problems, improvement of automatic back scatter rejection for forward, downward, or side looking sstems can be accomplished consistently with the simultaneous continuous wave and pulse operation of the laser. The problem of back scatter involves the fact that some atmospheric conditions such as fog and rain are absorbing and reflective thereby causing the laser illumination to be reflected into the receiver and in turn causing the receiver sensitivity to be decreased. The net result is that operational detection range of the laser sensor can be seriously degraded. It has been empirically established that argon, Nd:YAG, $CO_2$, and other lasers, because of power density in the highly collimated beam, can penetrate various weather conditions, but that the atmospheric weather conditions mentioned previously inhibit the receiver capabilities. Alleviation of this problem and the usual false alarm return problem can if necessary be accomplished where approximate range to desired target is known or computed, by using computed range to servo position or phase synchronize the image dissector precisely so that a smaller aperture can be used than is otherwise possible. Also, conventional range gating techniques analogous to those used in microwave ranging radar, to gate the input to separator-detector 25 (as by use of an electro-optical shutter before conversion or electrical gates after conversion) to reject returns other than those within the desired time gate and to thereby eliminate second time around beyond range false returns and also prevent some of the near and intermediate field back scatter from desensitizing the laser receiver. Once the approximation of range to target is achieved by the system or is manually inserted in the system, simultaneous pulsing of the continuous wave laser can be initiated and coordinated with gating such that in order to make a more precise measurement the receiver accepts the laser energy return from the target area only in a very small range increment such as 100 to 1000 feet as determined by the range gates. Suitable phase delay is provided by synchronizer 14 as seen in FIG. 7. Range gate circuits are well known in conventional microwave radar and may be included in range computer 18 to process sync signals derived from synchronizer 14 to thereby produce any desired timing pulses to be applied to the rest of the system. This mechanization produces the effect of excluding the greatest percentage of atmospheric back scattered energy. It is not a necessary feature of either embodiment of the system. Further, in embodiments utilizing a second wavelength, such back scatter is decreased for the pulsed wavelength.

The simultaneous pulsing of the continuous wave laser 10 has been discussed above in terms of one or a few operator selected pulses per complete scan of the scene. However, as shown in FIG. 14, such pulses can be initiated for terrain contour mapping or obstacle avoidance systems automatically at preselected coordinate increments in the laser sensor's field of view and can be triggered by including in trigger control circuit 13 a counter or oscillator 140 under switch selected timing control of the sync pulses from transmitter 15 and operating at an integral multiple of the vertical start scan pulser. The output of the counter (at least one pulse per vertical scan) is used directly to trigger range pulser 12 at each of a predetermined number of intervals during each scan for ranging and phase synchronization purposes. This permits ranging against a very large number of resolution elements during each raster scan thereby providing a sufficient number of sampled range elements in each scan of the field of view to indicate on any suitable display terrain contour variations or flight path obstacles. In order to preclude phase ambiguity, the interval between pulses should at least equal the round trip light transit time of the approximate range interval of interest so that the first pulse transmitted will be returned during the interval between the first and second transmitted pulses following a period of time equivalent to the round trip transit time to the beginning of the range interval of interest and may thus be used to provide an unambiguous memory address for the computed range value.

Figure 13:
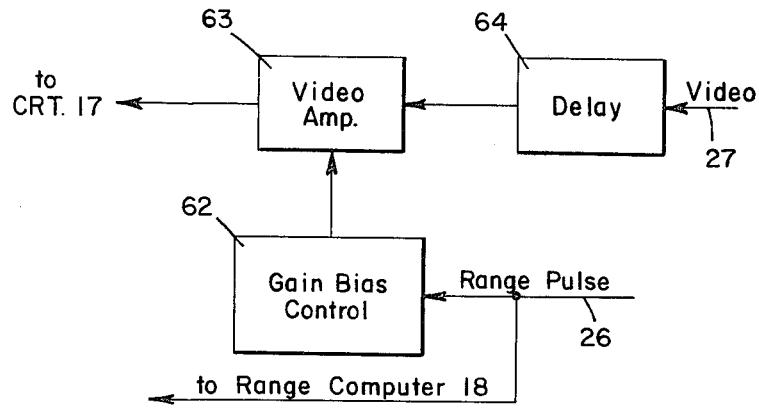
FIG. 13 is a video restoration circuit which may be used with the circuits of FIGS. 8 or 12 and which is particularly useful in connection with the system when it is being used for terrain contour mapping or obstacle avoidance purposes.

In such a system (which may be based on either embodiment but is discussed in connection with the dual frequency embodiment) the impairment of the video map which results from the bright spot appearing at the point of the range pulse return and which may be desired in the selected target systems, can be eliminated by using the range pulse returns as a timing signal to cut the gain of a video amplifier in channel 27 during the pulse return time by the same factor by whch the laser output was increased during ranging pulse transmission as shown in FIG. 13. To the video display intensity circuits the information will thus appear the same as would have been the case had only continuous wave constant amplitude energy been transmitted and reflected. As seen in FIG. 13 such a modification requires only that the range pulse output on channel 26 from separator 25 by applied not only to computer 18, but also to a gain bias control circuit 62 which appropriately cuts the gain of a video amplifier 63 supplying video output from channel 27 to CRT17. Preferably the video output of separator 25 is applied through an adjustable delay circuit 64 to video amplifier 63 so that enough delay may be introduced to allow for the response time of the bias control circuit 62 being used. This video restoration circuit uses the reception of the reflected pulse energy coincidently with the c.w. to enhance the fidelity of the map generated by the c.w. display and can be used with either embodiment. However, it is most useful in terrain avoidance systems which are preferably based on the second embodiment of laser operation to be discussed below.

In any of the systems which may be based on either embodiment of the invention the essential feature is the generation and detection of one or more laser output pulses simultaneously with the laser c.w. output. One specific means for doing this is shown in FIG. 2 which is a circuit diagram of the range pulse 12 and its connection to the laser power supply 11 and laser 10 which is used in any of the above discussed system variations of both embodiments. It will be seen from FIG. 2 that the range pulser circuit 12 includes a thyratron 30 the cathode of which is connected through pulse isolating choker 30a and 30b and conventional transformer 30c to any suitable filament supply. The anode of thyratron 30 is connected by a conductor 31 to one side of a charging power supply 32 which provides a fixed d.c. output voltage and which also supplies this voltage to one of the power input terminals of the laser tube 10. This input terminal as well as the anode of the thyratron 30 are connected to the negative pole of the laser power supply 11 which in turn is grounded. The other input to laser tube 10 is connected via conductor 33 and a pulse isolating choke or resistor 11a to the positive side of the laser power supply 11, and to a 0.1 microfarad capacitor 34 the other terminal of which is connected to the other or negative terminal of the pulser power supply 32 through charging resistor 32a. This terminal in turn is connected to the cathode of the thyratron 30 so that when the thyratron is conducting the capacitor 34 has a discharge path through the thyratron and the laser. Capacitor 34 is charged from power supply 32 through charging resistor 32a when thyratron 30 is non-conducting. The capacitor discharge through the conducting thyratron provides the pulse energy to the laser. Control of the thyratron is achieved by applying a trigger pulse to the grid thereof from the secondary of a trigger pulse transformer 35 which is connected between the grid and cathode of the thyratron. The trigger pulse is derived from circuit 13 of FIG. 1.

In a test of the first mode of operation of the laser, the duration of the trigger voltage pulse applied to the grid of the discharge thyratron tube 30 was 0.5 microseconds. The resultant light pulse output from laser 10 had a total duration of approximately 1 microsecond. In addition, there was a delay of one tenth microsecond between the application of the voltage pulse and the beginning of the light pulse. This is why timing feedback over line 28 in FIG. 1 is taken from the output of the laser. If, in a given system, this delay would introduce pulse aiming errors of a significant order of magnitude it can be compensated for by biasing which advances each raster's trigger pulse time an equivalent amount. It is here assumed that this error can be neglected.

For the particular laser used in this series of tests, the peak output power in he pulse tended toward a maximum value of 22.4 watts at high d.c. power levels yielding a pulse enhancement factor of 5.6 at 4 watts steady state d.c. output. The maximum enhancement of the 4 watt level occurred for a pulse amplitude of about 700 volts above the d.c. voltage level. These values were obtainable with no more than a five percent degradation of the laser light output at frequencies up to at least 1000 Hz.

This pulsed output of the laser 10 is applied in both embodiments as an input to the transmitter optics and scanner arrangement 15 the details of one mechanization of which are shown in FIG. 3. It should be noted, however, that any suitable arrangement could be used for this function.

In FIG. 3 output from laser 10 is passed through a plurality 40 of focusing and relay optical elements of a conventional or convenient nature to form beam 21 which is transmitted axially through the hollow core of an azimuth gimbal trunion 41 which serves as one mounting member for the housing (not shown) in which the transmitter-scanner is rotatably mounted. An elevation gimbal (not shown) similar to azimuth gimbal trunion 41 is also provided to aim the overall beam in the azimuth and elevation direction respectively in a conventional manner. Both gimbals are electrically operated and instrumented as usual in imaging systems.

After passing through the azimuth gimbal trunion 41 the beam 21 is focused onto the fast or vertical scan wheel 42. The beam next passes through a relay lens system 43 which images the pupil from the fast scan wheel onto the slow or horizontal scan wheel 44. The relay lens system 43 includes a first group of lenses 43a which transmits the vertically deflected beam to a folding mirror 43b which in turn transmits it to a second lens cell 43c for focusing the vertically deflected beam onto the horizontal scan wheel 44. The diagramatic showing of FIG. 3 indicates the relative three-dimensional directions involved.

By the means discussed above, the line output of the vertical wheel is deflected through a raster scan by the horizontal scan wheel 44. The raster scanned laser energy is again transmitted through a suitable lens and mirror system to a zoom lens beam expander 45. The zoom system may, for example, allow the raster to be continuously varied from a 3° by 4° to a 12° by 16° scan. An analogue voltage representative of its setting is fed to display means 17 to control indicia means indicating scan size. The wider field of view is suitable for target acquisition whereas the narrow field is used for tracking and/or precise ranging on a selected target.

The output of the zoom expander 45 is then focused through a relay lens system onto the elevation pointing mirror 46 from which the scanning beam is in turn transmitted through the transmitter window 47 in the aircraft or other mounting means to provide the output beam 21 shown in FIG. 1. The elevation pointing mirror 46 is used to orient the raster line of sight in the proper direction with respect to the gimbal coordinates on which the housing of the transmitter scanner is mounted. Once adjusted, the transmitter output or elevation pointing mirror 46 remains fixed.

The two scan wheels 42 and 44 are mechanically coupled as, for example, through a 752 to 1 ratio gear train with the vertical scan being the fast and the horizontal scn being the slow scan. The gear train is driven by a phase locked synchronous scan motor M which is in turn powered by a power amplifier driven from the master clock 100 included in the synchronizer circuit 14 so that the combined effect is to produce a scan pattern as illustrated schematically in FIG. 6 wherein each raster frame contains 752 vertical scans (arrow V) for each horizontal scan (arrow H).

Optical encoders of conventional design are used to generate sync pulses. The encoders include photodetectors in a housing 50 also containing a fixed light source which transmits a light beam paralleling the laser beam onto the wheel's mirrored surface for reflection back into the housing 50. The photodetectors therein respond to this reflected light impinging on them from the fixed source to generate synchronizing pulses that are used for timing and synchronization commands throughout the system as noted above.

With the system illustrated in the drawings, time difference ranging with simultaneous pulsing of a c.w. laser may be accomplished against any selected target within the raster scan field of view 53. The accomplishment of such ranging requires detailed knowledge as to where spatially the laser beam is pointing at the instant of time when a ranging pulse is transmitted. Such knowledge is available from a mechanization such as that illustrated in FIG. 3 where, as noted, a photodetector in housing 50 is diagrammatically shown receiving light transmitted from an emitter in the same housing 50 and reflected from the vertical deflection wheel 42. It will be understood that a similar encoder may be provided for the horizontal deflection wheel 44. In fact, any conventional arrangement may be used to provide on output line 52 from housing 50 one or more pulses which are synchronized with the scan starting point in time. If only the vertical sync pulses are generated by encoders, count down circuits may be used to derive horizontal scan sync pulses in view of the geared wheels used. Precision optical systems may be used to forcus the output of the light emitter back onto the detector in the encoder so that its electrical output is a precise step function coinciding with the start of the vertical scan of the laser beam.

It will be recalled that the laser energy is impinged against the vertically oriented multi-faceted wheel 42 which has a rotational velocity determined by the synchronous motor drive and the gear ratio. Each mirrored facet causes the laser beam to be deflected through a vertical fan shape by virtue of the fact that the rotation of the wheel causes the angle of incidence (and therefore of reflectance) of the laser beam to constantly change at a rate defined by the wheel's rotational speed. Each mirror facet generates one line scan and the next facet picks up where the previous scan began.

The optical system 43a for the vertically deflected beam focuses the beam to a relatively very small vertical deviation in order to permit the use of the similar but horizontally oriented scan wheel 44. After reflection from wheel 44, the laser beam has both horizontal and vertical (or azimuth and elevation) deflections. This mechanization provides synchronous rotational velocities for each scan wheel and the pulse signal outputs which define the exact starting point in time of each vertical and horizontal scan permit scan coordinates to be defined to a high degree of precision.

Stated another way, a pulse is produced at the start of the scan in each direction. The synchronous constant speed rotation of the wheels mean that a precise time period elapses for each angular unit of wheel rotation. Time can be counted by conventional circuitry operated by the master oscillator clock 100 from the start of each scan as measured by the start pulse. A time count of 10 microseconds thus exists when the laser beam is pointed to a specific spatial position. Time counting of 10 microseconds from the start-scan pulse of the horizontal scan wheel will bring one to a point partially through the first horizontal scan and partially through the vertical scan numbered (10/T) 752 where T is the raster frame period, and will thus define a precise pair of coordinates of a spatial position to which the transmitted laser beam is pointing.

Figure 4:
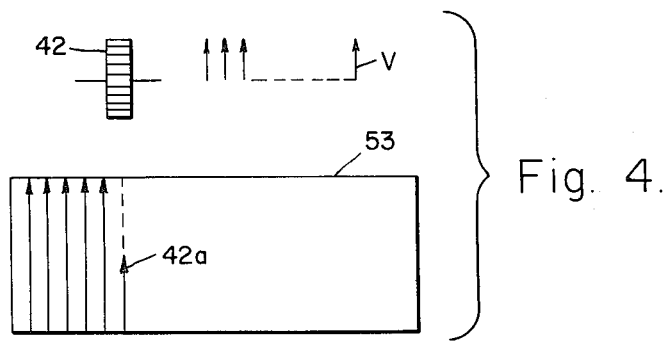
FIGS. 4, 5, and 6 are graphs illustrating the timing relationships involved in the scanning pattern as applied to both embodiments.
Figure 5:
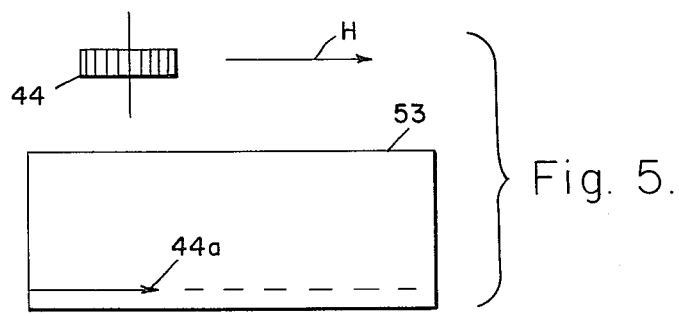
Figure 6:
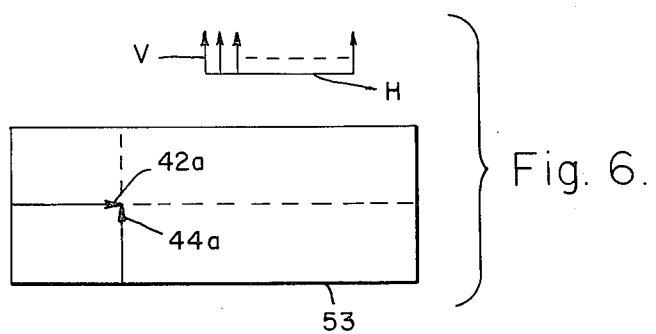

This is diagrammatically illustrated in FIGS. 4, 5, and 6 which are not drawn to scale. In FIG. 4 the vertical wheel 42 is assumed to have rotated for 10 microseconds beyond the start scan point to bring the laser beam up to point 42a in a vertical deflection in the raster scan pattern 53. Similarly in FIG. 5 the horizontal deflection wheel 44 is assumed to have rotated for 10 microseconds beyond the horizontal start scan point to bring the laser beam to the horizontal point 44a indicated by the arrow head on the solid line. The dashed line, of course, indicates that portion of the scan lying beyond 10 microseconds deflection just as the dashed line in FIG. 5 indicates a portion of the vertical scan lying beyond the 10 microseconds vertical deflection.

In FIG. 6 there is illustrated the effect achieved by combining the vertical and horizontal scans in the manner accomplished in the optical system of FIG. 3. It will be apparent that the intersection of the point occupied in common by point 42a as shown in FIG. 4 and point 44a as shown in FIG. 5 is the actual position of the laser output beam 21 within the raster 53. Since this raster 53 automatically defines the limits of the scene 20 to be scanned, and since the sweep circuits of the cathode ray tube are synchronized to reproduce a corresponding raster scan, an obvious correspondence exists in the time and space coordinates of the laser beam timed scan pattern, the scene being scanned, and the display on the cathode ray tube 17. That is to say, a laser pulse triggered to be released 10 microseconds after start of the transmitter scan will strike the point which was at point 44a of the scanned scene at which the beam was aimed at the instant of pulsing even though the scanning wheels continue to rotate. Similarly, even though there is a finite (and measurable) light transit time to target, the CRT in a stationary or non-moving system will later display light reflected from this point 44a at a point on the map display which is identifiable by corresponding spatial coordinates if the transit time is allowed for either by adjusting the phase of the image dissector and CRT a corresponding approximate lagging amount as in the first embodiment or, as in the second embodiment to be discussed below, by synchronizing the phase of the CRT video display to the actual phase of the incrementally spaced range return pulses and detecting the first wavelength image signal with an open aperture photomultiplier. Alternatively and preferably, one may first approximately synchronize the phase of an image dissector and thereafter exactly synchronize it to the phase of the returned range signals automatically.

The operator viewing the real time display on cathode ray tube 17 may in any event then designate the target in the field of view displayed to be ranged against by any of the several techniques suggested above. Thus, a photodiode in a light pen can be placed by the operator on the display at the point where the target to be designated is displayed. When a reflected pulse illuminates this point the photodiode generates a CRT timed pulse which is modified by the round trip transit time to get a range pulse trigger such that the range pulse is correctly aimed in space. This modification is required as noted above since the transmitter is leading or the image dissector and CRT are lagging in phase by an amount equal to the entire round trip transit time. Such a phase lag if not compensated for would be equivalent in the transmitter timed scan to an angular displacement.

Equivalently, cursors equipped with potentiometer pick-offs can also be used. The operator target designation is mechanized to determine a time relative to transmitter start-scan pulse at which the designated target appears in space as angularly measured by the phase delayed video display scan. In systems intended for uses where motion of the vehicle carrying this system is too large to be neglected, it must also initiate computation of the time at which a trigger pulse must be applied to the laser pulse modulator during the next raster to range against that target allowing for vehicle motion as well as light transit time. Such computation circuitry may be conventional digital computer circuitry contained in the range computer 18 if and when it is required. This circuitry is not shown in detail since it does not form a part of the present invention. In principle the operation of the present system may be clearly understood by considering the receiver to be fixed in position relative to the target and the image dissector aperture wide open until image synchronization is achieved. Relative motion introduces an error which may or may not be neglected depending upon the magnitude of the relative motion and the degree of accuracy required.

As indicated by line 28 in FIG. 1, when a ranging pulse is transmitted a small amount of the laser energy is supplied to a separate photodetector in the range computer 18 to derive a step voltage output therein. This triggers the start of range counting devices in computer 18 which continue their count until a pulse return from the target is separated by circuit 25 from the c.w. video signal and applied over line 26 to the range computer 18 to stop the counters. The total count between start and stop pulses is, of course, a measure of elapsed time and hence of distance to the target. The count, or a range measure derived from it, may be displayed by any convenient means or may be supplied to any suitable utilization circuitry.

In the first embodiment of the invention the returned range pulse which stops the counters and affords a measure of range is separated from the c.w. image signal by means of the separator circuit 25a shown in detail in FIG. 8. The total reflected light beam 23a from the receiver optics 24 is applied to a beam splitter such as a partially silvered mirror 60 disposed obliquely to the reflected beam 23a so that a first portion of the beam 23a is reflected as at 23b to a photomultiplier 61 while the remaining portion of the beam 23a is transmitted through mirror 60 as at 23c and is applied as an optical input to an image dissector or photomultiplier tube 70. The beam 23c is of course used to generate the image signal. The transducer 70 is preferably an image dissector tube which is operated in the manner discussed above to provide an image video signal which is supplied over line 27 to modulate the intensity of the electron beam in the CRT17. The sweep within the image dissector 70 may be timed by signals applied to it from synchronizer 14 over line 71 in a manner which is shown in detail in FIG. 7 and which will be discussed below. As noted above, if gating techniques analogous to those used in radar ranging are required in a given application, the gating signals may be generated in range computer 18 and/or synchronizer 14 as may be convenient and may be applied as needed. The output of image dissector 70 is applied over line 27 to modulate the beam intensity of the video display tube 17.

The reflected portion 23b of the light return 23a is applied to a photomultiplier tube 61 which is operated with a fully open aperture so as to integrate all of the light reflected from the scanned scene at any given instant. The output of photomultiplier 61 is applied over line 54 to an amplifier 55 having adjustable gain and to a false alarm control circuit 56. The output of circuit 56 is applied to a bias supply circuit 57, the output of which is in turn used to adjust the minimum response level of the variable threshhold circuit 58. This threshhold is set just high enough to reject the c.w. image return so that the output of the variable threshold circuit 58 is only the range pulse which is applied over line 26 to stop the counters in range computer 18.

One simple form of false alarm control circuit suitable for use in block 56 is a voltage averaging network having a time constant such that it averages the voltage over and interval which is large by comparison to the range pulse width but less than the total duration of one raster frame scan. The output of this averaging circuit is multiplied by any conventional analogue multiplier circuit to be applied as the input to bias supply 57 so that the minimum response level of the variable threshold circuit 58 will be at all times equal to the average value of the output of photomultiplier 61 times an arbitrary factor M which is determined by the design requirement of each system. The gain of amplifier 55 is initially set to have the same numerical value as the factor M so that only image returns above average intensity will initially be passed. Once the imaging radar is placed in operation in an image only mode under given environmental conditions, the gain of amplifier 55 is manually adjusted downwardly until no image output is detected from the variable threshold circuit 58. Thereafter, when the ranging pulses are applied to the laser output, it will be found that only the ranging pulses have sufficient amplitude to exceed the minimum response of threshold circuit 58.

This may be more clearly seen by considering an arbitrarily normalized numerical example. Let us assume that at a given level of c.w. laser transmitted power the output of photomultiplier 54 ranges between 1 volt and 3 volts and has an average value of 2 volts. This average value is multiplied by 10 in false alarm control circuit 56 so that the bias supply 57 will adjust the threshold of circuit 58 to respond only to input signals from amplifier 55 which exeed 10 times the average output of photomultiplier 61 or 20 volts. While the threshold of circuit 58 is set at 20 volts and the gain of amplifier 55 is initially set at 10 volts, all instantaneous outputs of photomultiplier 61 above the average value will be passed through circuit 58. The gain of amplifier 55 is now reduced until the maximum video return is not passed through circuit 58. In this example, if the gain of amplifier 55 were reduced from 10 to 6, the maximum 3 volt output signals of photomultiplier 61 would be below the threshold value since for these signals the output of amplifier 55 would be 18 volts. Hence, no image video is passed. When a ranging pulse is applied, however, the over-all power level is increased by a factor of at least 5 so that the minimum return signal is now not 1 volt at the output of photomultiplier 61 but 5 volts. The gain of 6 in amplifier 55 raises this to 30 volts which exceeds the 20 volt setting of the threshold circuit. Of course the reception of the ranging pulse will have some affect on the average value sensed by circuit 56, but on a small duty cycle basis with the time constant specified this would not significantly affect the reasoning set forth above. Should it be found that excessive false alarm returns are being passed through the threshold circuit 58 as from a high contrast scene, this circuit can, if desired, be followed by a conventional pulse width discriminator circuit which will respond only to incremental increases in output having a pulse duration or width equal to that of the known pulse width transmitted. Such circuits, of course, differentiated both sides of the pulse and (after delay of the leading edge by the known pulse width) apply the two resulting pulses to an AND gate. In most applications, however, this additional complexity is not necessary. Output from threshold circuit 58 is applied over line 26 to the range computer 18 to stop the counters and provide the measured range output signals.

As noted above, the circuit of FIG. 8 is intended for use in any of the systems variations of the first embodiment of the invention wherein laser output at substantially only a single wavelength is transmitted. This embodiment also uses the pulse circuit of FIG. 2 and the transmitter scanner circuit of FIG. 3 for the respective functional blocks indicated in FIG. 1.

Synchronization of these functions in both embodiments is achieved by circuitry such as that shown in detail in FIG. 7 which is of a general type heretofore used in laser imaging radars. Essentially, the synchronization and deflection circuits program and synchronize the scan patterns employed by the transmitter, the receiver image dissector, and the CRT video display.

In the transmitter section the multi-faceted mirrored wheels are driven by the frame mirror drive motor M which is an electric synchronous motor powered from a stable frequency oscillator such as the binary counter 100 which, through suitable pulse shaping circuitry, feeds a driver amplifier 105 connected to the motor M. Conventional zoom telescope circuitry may be provided as shown if desired.

At the receiver, no mechanical motions are required to descan the received image. Instead, the collimated energy is imaged at the photocathode of the image dissector, and the rectangular scanning aperture of the image dissector is programmed to follow the received energy. This programming must, first, provide scale compensation as the transmitted field of view is varied, and secondly, compensate for variable round trip transit times of the received energy due to the finite velocity of light through varying ranges.

As has been noted in FIG. 3, the encoders are an integral part of the transmitter apparatus and provide the basic sync pulses. The output of the encoder 50 shown in FIGS. 3 and 7 is a train of pulses, each of which are synchronized with the beginning of each vertical scan line. These pulses are used to produce all of the horizontal and vertical sync pulses used in the transmitter, receiver, and display systems. The block diagram in FIG. 7 shows how the output of the encoders is used.

The output of the encoder is developed by illuminating the encoder surface and placing a photo-transistor in the path of the reflected light. By appropriately placing reflective areas on the encoder surface or the encoder portion of the wheel surface, the sync pulse output is developed as the wheel is rotated past the photo-transistor. The output thus developed is coupled to both the receiver and the transmitter. Along one path it is processed by the counter 100 and a digital to analog converter 106. One of the converter outputs is a ramp function that is used in the receiver for the horizontal deflection circuitry and is also used to provide the horizontal sync pulses to the display. The other converter output is used in the transmitter to stabilize the frequency and phase of the motor drive. The amplitude of the angular light displacement resulting from the rotating mirror wheel drive may be sensed by any convenient means such as a synchronously driven variable reluctance pickup 110 or a photodetector similar to the encoders. After detection the output voltage of this pickup is fed back to the driver amplifier 105 where it is used to correct for any gain variations within this closed loop. A second output of detector 111 is used to provide an input to the receiver horizontal deflection system. This input provides the receiver with a signal whose amplitude is proportional to the horizontal dimension of the transmitted field of view.

Returning to the digital to analog converter 106, the ramp output provides an extremely linear ramp function that is required to drive the horizontal deflection circuits of the image dissector deflection coils. This digitally controlled output driving the deflection circuits is inherently capable of greater accuracy and stability than the older forms of analog deflection voltage generators.

This ramp function is electronically multiplied at multiplier 112 by the detected output of the transmitter's horizontal axis variable reluctance pickup 110. The output of the multiplier thus controls the horizontal dimensions of the receiver field of view. Parallax compensation is required in the horizontal deflection circuitry since the transmitter and receiver are mounted in spaced apart relationship, both lying on a line perpendicular to the path of flight or vertical deflection direction and on opposite sides thereof. Such parallax compensation is conventionally performed by the circuitry of FIG. 7 so that the correction is varied with changes in range to the terrain being imaged. Briefly this is accomplished by providing to summer 113 signals proportional to the altitude and sign of the elevation look angle as measured from a negative vertical axis to produce a d.c. signal proportional to slant range. This signal is applied through amplifier 107 to image dissector horizontal deflection coil 70b to move the scanning aperture along the horizontal axis to automatically readjust the convergence angle. In the presence of rough terrain the operator may desire to optimize system performance for a particular target of interest. This is provided for in the form of a control that permits the operator to manually superimpose a variable d.c. voltage onto the automatic convergence angle compensation voltage as shown. The output of the multiplier 112 and the convergence angle compensation signal are combined in summer 113 to form the input to the horizontal deflection drive amplifier 107.

To preserve the stringent scan accuracy requirements, a closed loop is formed around the multiplier convergence angle compensation and horizontal deflection circuits. The control input to the multiplier first passes through a feedback summing network, and after multiplication and convergence angle compensation, the signal is amplified and used to drive the horizontal deflection coil of the image dissector. The peak coil current which is indicative of sweep amplitude, is amplified, detected, and fed back to the feedback point of the summing network.

The scan of the vertical dimension of the receiver field of view is affected by a number of factors that are related to the rapid vertical scan rate and the finite variable propagation time of the laser beam from the transmitter to the receiver. Where azimuth is taken perpendicularly to the line of flight of an aircraft and elevation is thus along the line of flight in a system which is forward and downward looking, the return slant range from the upper edge of a vertical trace will be greater than that from the lower edge of the same vertical trace for level terrain and the required light transit time will therefore be measurably greater. The vertical deflection drive of the receiver must lag that of the transmitter by an amount proportional to its scanning rate and to the approximate average time required for the energy to return.

Because the range to the center of the vertical scan is a function of the altitude of the aircraft and the pointing vector depression angle of the transmitter, the start of each receiver vertical sweep line could be delayed by an amount computed using only these inputs. Therefore, if a fixed delay were provided to the start of the receiver vertical sweep it would delay the start of the sweep by a corresponding number of degrees of deflection. The required image dissector slit length can be further reduced and noise rejection enhanced, however, if further compensation is performed to account for the change in propagation delay during the vertical sweep. Such compensation is provided in the voltage supplied to the vertical deflection coils 70a of the image dissector as shown in FIG. 7.

The vertical sync pulse output of the encoder wheel is fed to a monostable multivibrator 101 where it is used to start a time delay. The period of the time delay is directly proportional to a d.c. control voltage supplied from switch S-3. In one position S-3 derives this voltage from the multiplexer 102 and the operator's control shown beneath it. The multiplexer receives three d.c. voltages, one of which is proportional to the altitude of the aircraft, another is proportional to the sine of the elevation look angle as measured from the negative vertical axis, and a third voltage, which is fed from a potentiometer coupled to the zoom telescope drive mechanization, which voltage is proportional to the vertical dimension of the field of view. In the alternate position of S-3 a voltage R which is proportional to the actual measured value of slant range (corrected for vertical dimension of field of view) as derived from range computer 18 is applied. As is well known, actual range is equal to half the product of the velocity of light multiplied by the round trip or total elapsed time between range pulse transmission and reception of the reflected pulse. As a result of either implementation, a controlled time delay is provided to start the beginning of each vertical line sweep in time coincidence with the receipt of the reflected energy from the corresponding angular position of the transmitted laser beam.

By summing in an operator controlled d.c. voltage that can also vary the time delay of the multivibrator, the operator can also compensate for large differences in terrain altitudes. This is less necessary if measured voltage R is used rather than an externally calculated estimate, but it does provide the operator with a means to optimize the system performance for any portion of the field of view that he selects for closer examination, or to adjust for any slight loss of synchronization which becomes visually apparent.

The output of the multivibrator is differentiated and clipped to provide the delayed sync pulse to the vertical deflection generator 115 in the receiver. In the receiver the signal is fed to a shaping network followed by a gain controlled amplifier 107 and a field of view size multiplier. The combined effect of this portion of the deflection system is to alter the shape of the delayed receiver vertical sweep voltage to provide continuous propagation delay compensation throughout the entire vertical sweep.

The delayed output of the deflection amplifier is fed to a shaping amplifier 116. The amount of shaping varies as a function of the elevation angle input, which is also fed to this amplifier. Due to the shaping process the output of the amplifier has an amplitude that varies as a function of the degree of shaping. Peak amplitude normalization is accomplished by next passing the shaped signal into a gain controlled amplifier 107. The output of this amplifier is fed to two places. It is fed to a peak detector 117 and after comparison with a fixed reference voltage, the gain of the amplifier 107 is controlled to maintain a fixed peak amplitude at its output. The signal is also fed to a third potentiometer 108 coupled to the zoom telescope drive mechanism. The signal taken off the wiper arm of this potentiometer 108 is proportional to the vertical dimension of the field of view and is fed to the vertical coil deflection feedback amplifier 109. Thus the vertical axis will be driven by a deflection signal that is compensated to have the required amplitude versus time wave form and can thus track the reflected laser beam.

Synchronization signals and horizontal and vertical deflection ramps for the display in the CRT are derived from the image dissector sweep signals in the manner shown. In addition, an automatic indication of the relative size of the displayed field of view may be displayed as a cursor separation. If desired, the video output may be processed by taking the output from the scanning aperture of the image dissector and supplying it to a detector amplifier followed by a series of video enhancement sections.

In the foregoing manner the circuitry shown in FIG. 7 provides the synchronization indicated by block 14 in FIG. 1 in systems utilizing either embodiment of the invention. In the contouring embodiment to be discussed below where it is usually desired to phase control the receiver sweep by the measurement based on actual returned range signals themselves in the manner suggested above, it is only necessary to disconnect the output of the multiplexer 102 from the summer 103 by opening switch S-3 and to supply in place thereof the d.c. voltage R generated by the digital computer 18 which is a measure of currently measured range based on the last vertical start-scan pulse returned or on any selected average series of pulse returns and which is made available on the other terminal of switch S-3.

This modification eliminates what has in the past been referred to as video dropout. Imaging systems operated in an air-to-ground environment can experience a loss of video return from the ground unless reasonably good estimates of slant range are made by the operator or by a computer based on data on ground contour. The loss of video has to do with the spatial positioning, of a scanned photomultiplier receiver or a physical-electrical aperture in an image dissector or other aperture scanned receiver, to subtend the area most likely to return reflected energy. For example, if an aircraft equipped with a scanned laser imaging system were flown at constant altitude over widely variant contour terrain, the two-way transit time for the laser energy to the ground relative to the specific receiver instantaneous look/viewing angle could be grossly misjudged or miscalculated. Typically, receiver apertures are wide enough (spatially range gated) to tolerate some slant range variation (produced by contour variations) but general topography has enough variations to heretofore produce video dropout or loss. In the event of total loss of video due to errors in range estimates, the present system can be operated in a pulse mode only for a few pulses spatially positioned in the field of view, thereby developing the range data to reposition the receiver scanning aperture accurately. This capability can be simply implemented by closing the electronics loop to the receiver aperture sweep/deflection circuits with the proper scaling factors thereby providing automated reflected imagery (video) tracking and preventing video dropout or loss as discussed above.

In FIG. 14 there is shown a detailed block diagram of that portion of the circuitry within the range pulse timing control unit 13 which is used when, as in the contour mapping operations typical of the second embodiment, it is desired to send a plurality of ranging pulses at predetermined increments throughout each raster frame. It will be noted in FIG. 14 that the vertical start scan pulses are supplied over cable 19 to a counter 140 which functions as a count down circuit to provide any desired integral number of sampling pulses during each vertical scan. The output of the counter 140 is supplied to the range pulser 12 via a switch S-4 which is mechanically ganged to switch S-2 to accuate this mode of operation. Since these timing pulses are themselves derived directly from the transmitter raster scan rather than from the CRT there is no need for a phase adjustment to account for the phase lag of the image dissector and CRT scans. The displayed image will of course occur later in time by an amount which is determined by the round trip transit time. This phase lag which is provided in the image display in the manner described above will assure that the display is a correct angular representation of where the individual ranging pulses actually struck the scanned scene.

It will be noted that a conductor 141 is provided which may transmit the individual vertical start scan pulses directly to the computer 18. This may be useful where it is desired to gate the corresponding first pulse of each vertical scan which is transmitted over channel 28 from the laser output into a separate counter in the computer so that the computer may, if desired, use only this first pulse per scan for purposes of computing the values of R to be applied to switch S-3 in FIG. 7 or for otherwise controlling the phase synchronization of the video image.

In FIG. 15 there is shown a detailed block diagram of that portion of the circuitry in the range pulse timing control 13 which is activated when switch S-1 is closed to initiate ranging to a single selected target. It will be noted that the switch S-1 when closed connects the deflection voltages of the cathode ray tube 17 which are supplied on line 17a to a sampling device 150 which reads the value of these deflection voltages at the instant a pulse is detected by the light pen or the cursor intersection. These sampled values of the horizontal and vertical deflection voltages are supplied to an analog-to-digital converter 151 which in turn supplies to a digital storage register 152 a numerical quantity which is a measure of the position of the sampled spot within the displayed image. By way of arbitrary or hypothetical illustration, let us assume a raster which is composed of one hundred fast vertical scans for each slow horizontal or azimuthal scan. Let us further suppose that the image is square and that our resolution is such that we can detect the equivalent of one hundred lines in both directions, that is to say, that each vertical scan in turn can be resolved into one hundred equal increments or resolution elements. This will obviously give an image having ten thousand resolution elements, one hundred elements in each of one hundred separate vertical scans. These resolution elements can of course be numbered sequentially so that when the analog-to-digital converter 151 samples the horizontal and vertical deflection voltages and compares the instantaneous values with the maximum programmed values it can supply on line 153 a digital signal to register 152 which is a number identifying the individual resolution element from which the light pen trigger signal arose. Thus, if the element were half way up the third vertical scan it would carry a number of 250.

When switch S-1 is closed it also closes a switch S-5 which is ganged to it and which connects conductor 19 carrying the vertical start scan pulses from the transmitter scanning wheels to a counter 154. This counter is designed or programmed so that it too will count up to a maximum of the same number of resolution elements for the image as has been noted above within the same time period. In the arbitrary example the counter 154 will thus count ten thousand elements, one hundred for each of the one hundred vertical scan pulses on line 19. After the count of ten thousand is reached it resets to zero and begins again. This reset is accomplished by supplying it with a horizontal sync pulse from the transmitter which may also be on line 19.

The phase lag between transmitter and image dissector or CRT is accounted for by this circuitry shown in FIG. 15 by supplying both the output of counter 154 which has a zero or start counting time determined by the transmitter scan and the output of register 152 which has a zero or start counting time effectively determined by the phase of the CRT scan, to a comparison circuit 155.

Since the phase of the image dissector and CRT scan lags the phase of the transmitter scan by a time period equal to the round trip transit time of light to the scene being scanned, the digital contents of the register 152 will similarly lag the contents of counter 154 by a numerical quantity which is proportional to this transit time. That is to say, during any one raster the contents of register 152 will be numerically smaller than the contents of counter 154. Hence when S-1 closes and the CRT deflection voltages are sampled, the output of register 152 which is supplied to comparator 155 will be smaller than the output of counter 154. The quantity in register 152 is therefore held there for comparison until the counter 154 completes that raster and again starts from zero and increases to a number equal to the number stored in register 152. At this time the comparison circuit 155 provides an output pulse which is the timing pulse from control circuit 13 which is supplied to the range pulser 12 the circuit details of which have been discussed above in connection with FIG. 2. This FIG. 15 circuit thus automatically compensates for the phase lag and causes the transmitter to be pulsed at a time such that it will then be aimed in an angular direction which is defined by the same numerical coordinate as the coordinate on the CRT display of the target which it is desired to range against. This will still be true even if operating circumstances are such that the round trip transit time of light is greater than the time duration of a single ten thousand element raster frame. Since the only system requirement is that the transmitter actually be aimed when fired in the angular direction which is defined by the time displaced image on the cathode ray tube, the actual total value of the slant range round trip transit time is not controlling. Only the counter measured phase difference is relevant.

Either of these modes of ranging, that is to say, contour mapping or single target ranging may be used in the second embodiment as well as in the first embodiment of the invention. In the rest of the detailed implementation of the second embodiment of the invention, the CRT17 and general purpose computer 18 of FIG. 1, the pulser circuit of FIG. 2 and the transmitter scanner of FIG. 3 are again used, but the conventional gas laser 10 shown in FIG. 1 is modified as shown in FIG. 9 and the separator-detector circuit 25 is modified as shown in FIG. 12.

FIGS. 9, 10, and 11 illustrate the mode of laser operation utilized in the second embodiment of the invention. In FIG. 9 the laser 10 of FIG. 1 is shown replaced by a laser 10a, to be described in detail below, having a discharge tube including an anode and cathode to which the positive and negative outputs of a conventional power supply 11 are applied in the same fashion as shown for the tube 10 in FIG. 2. That is to say, the power supply and pulse triggering circuitry for the laser 10a is identical in structure to that shown in FIG. 2. However, the voltage levels applied are modified as explained below and appropriate mirrors 35 and 36 are specially designed for this mode of operation.

It has been found that if a particular argon ion laser, for example, is operated with 4 watts continuous wave output primarily in the ArII 4880A and 5145A lines at 25 amperes average discharge current and 0.5 Torr gas pressure, only these wavelengths of c.w. output will be produced. If now pulses of 80 amperes are superimposed on this current, 32 watt output pulses are obtained at these same wavelengths. However, at this higher current level the higher ionization states are also populated and sufficient gain can be made available to cause the ArIII lines to oscillate, particularly ArIII 3638A and ArIII 3511A lines. These lines have a threshold of approximately 30 to 35 amperes in c.w. operation in such a laser. That is to say, they will not be produced until the discharge current reaches these values. Hence they are not produced at the 25 ampere c.w. operating level but are produced when the threshold values are exceeded.

The mirrors 35 and 36 which are added to the laser as shown in FIG. 9 are such that they have optimum reflectivities at both 4880A/5145A and 3638A/3511A. This is accomplished, for example, by utilizing two sets of multilayer dielectric coatings on each mirror so that maximum reflectivity is obtained at both wavelengths on one mirror and optimized transmission (typically 5 percent for 4880A/5145A and 3 percent for 3638A/3511A) is obtained on the other mirror. Fabrication of such mirrors for other purposes is now a standard commercial practice. With such mirrors and operating conditions a pulsed output can be obtained the nature of which is graphically illustrated in FIGS. 10a through 10d.

FIG. 10 is a voltage versus time plot of the voltage applied to the anode of the laser and FIG. 10b is a plot of the resulting laser discharge current versus time. It will be noted that the steady state values of both voltage and current which are used to produce the continuous wave light output have short pulses superimposed on them. Thus, the steady state voltage level 37a is pulsed as at 37b. The pulse 37b results in a current pulse 38b which is superimposed on the steady state or continuous current level 38a. FIG. 10c is a plot of the radiant energy power output of the laser at the 4880A/5145A wavelength versus time. It will be noted that the amplitude of this output has a pulse 39b corresponding in time to the voltage and current pulses 37b and 38b superimposed on the steady state output value 39a. This component of the transmitted power is used to derive the image video signal. As discussed above, the circuit shown in FIG. 13 may, if desired, be used to reduce the gain of the reflected signal during the time periods when the pulses 39b are being received if the utilization is such that a bright spot at the scan element receiving ranging pulses is not needed and a wholly undistorted image video signal is desired for an undistorted reflectivity map display.

In FIG. 10d there is shown a plot of the radiant energy power output of the laser as a function of time for the energy transmitted in the second wavelength band at 3638A. As pointed out above, output at this frequency is emitted only when the excitation threshold is exceeded. Thus this output component is zero during the steady state continuous wave operation of the laser. It is emitted in pulses such as 49b which occur only during the time intervals when the voltage and current pulses 37b and 38b respectively are applied to the discharge tube 10a.

The component of laser output at the first wavelength as shown in FIG. 10c is separated from the component of laser output at the second wavelength as shown in FIG. 10d by the electro-optical circuit arrangement shown in FIG. 12 so that the output at the first wavelength may be used to present a reflectivity map display of the scene scanned while the output component at the second wavelength illustrated in FIG. 10d is used for range measurement purposes. The circuit of FIG. 12 will be discussed in detail below.

The existence of the two sets of wavelengths in the argon ion laser emission which has been observed as described above is believed to be due to the mechanism illustrated in the energy level diagram for argon shown in FIG. 11 wherein the lowest energy level (Ar) is the argon ground state, the next higher level is the singly ionized ground state ($Ar^+$), the next highest state is the doubly-ionized ground state ($Ar^{2+}$), and so forth. The notation at the left of the diagram (ArI, ArII, ArIII, etc.) indicates the classes to which the sets of spectral lines emitted in that energy level belong. The lines designated by ($e^-$) show not the exact path followed by the electron in collisional excitation, but indicate the number of electron collisions necessary to reach the energy levels shown.

Thus, the doubly ionized states from which the 3638A line is emitted in the ArIII level are excited by three electron collisions rather than by the two electron collisions which are sufficient to excite the singly ionized states in the ArII energy level which result in the emission of the 4880A/5145A lines. It follows that the power output from the doubly ionized states varies as the cube of the current while the power output from the singly ionized states varies as the square of the current. It is thus possible to operate on a continuous wave basis at the ArII levels with the ArIII levels below threshold. Pulses, such as the pulses 37b, 38b shown in FIGS. 10a and 10b, then turn on the ArIII levels very rapidly and intensely, the power output varying as the cube of the current.

This particular set of energy levels for argon is, of course, only one example of this process. There are many other operating gases and sets of operating conditions from which it is possible to obtain an output pulse of a different color than that which is being simultaneously obtained on a steady state or continuous basis by applying a suitable voltage and current pulse in addition to the steady state continuous wave current level in an ion laser. Another example would be ionized krypton in which the Kr II 6471A red line may be operated c.w. and pulses used to obtain output at the Kr III 4131A violet line. Many possible combinations exist where c.w. operation has been obtained with a singly ionized transition and pulsed or c.w. operation can simultaneously be obtained at a higher current in a higher ionization state.

It is also possible to obtain pulsed color shifted operation in a lower or in the same ionization state. For example, a conventional helium-neon laser operating on Ne I 6328A will oscillate on the Ne I 6143A transition when additionally pulsed with a very fast rising pulse. Operation at 6143A is of the self-terminating type, so that very short pulses having a duration of 10 to 20 nanoseconds or less are obtainable, and it is has the further advantage that highly reflective laser mirrors covering both wavelengths are very easy to make. These very short duration pulses are especially useful in contour mapping systems where it is desired to transmit not one or a few range pulses during each raster, but rather a very large number of equally spaced pulses throughout the entire raster to provide a sufficiently large number of range measurements or samples to permit mathematical or computer synthesis of a complete contour map of the scene specifying range to any imaged element. In such systems the first of these range pulses in each raster is timed to coincide with the first start scan pulse so that they may also be used to phase synchronize the video display as noted above. In one preferred system such nanosecond pulses are fired at a rate of the order of magnitude of 100,000 pulses per second so as to leave a return interval of about 10 microseconds between pulses. This imposes a known range variation or degree of error constraint having a time equivalent of about 10 microseconds or 5,000 feet of slant range to avoid "second-time-around" ambiguities or false returns and thus afford unambiguous phase locked range sampling within the specified slant range interval of 5,000 feet. The actual velocity of light is, of course, 985 feet per microsecond. The round number approximation is based on an assumed value of 1,000 ft./microsecond or 500 feet per microsecond for the round trip value. Hence the 10 microsecond dead time will give an unambiguous return with phase adjustment and gating based on approximately known range within an accuracy interval of as much as five thousand feet. That is to say, if slant range is known to be between 50,000 and 55,000 feet and gating is such as to accept a return for each sampled image element sequentially only within its assigned time interval, no ambiguity will exist as to where a particular return should be stored in the bank of memory addresses of the computer to give precise range of that scene element.

As a further example of operating gases, it is noted that a conventional ArII laser operating at 4880A/5145A will oscillate on the 8104A 4p → 4s or the 1.24 and 1.27 μ 3d → 4p, 3d → 4p transitions in ArI if the added current pulse is fast rising and of sufficient magnitude (at least a few hundred amps). This mode of operation has the advantage that the 8104A and 1.2 μ lines are superradiant and thus require only a minimum of mirror reflectivity at these wavelengths. Blue/green mirrors on aluminized substrates afford sufficient reflectivity for this type of operation.

Many other combinations exist in which a color shifted pulse is obtainable from a c.w. operating gas laser which pulse can be used to obtain range information in a scanned laser imaging system. Depending upon system environment, intended functions and accuracy requirements, the use of the dual wavelength ranging mode is often warranted and desirable in order to realize better performance, to reduce the false alarm problem, and to reduce the complexity of the system for a given performance standard. It is particularly suited to applications where approximate range to target is not already known from other systems since pulse-only measurement of ungated range can easily be made unambiguously either by averaging all range wavelength returns in a single frame or by firing range pulses only at any arbitrary fixed point in the scene by the techniques discussed above. In such a mode, video return is of course received but the as yet unsynchronized display does not produce an image.

In the dual wavelength mode of laser operation used in the second embodiment of the invention the separator-detector circuit 25 of FIG. 1 takes the form illustrated as 25b in detail in FIG. 12.

In FIG. 12 it will be noted that the total reflected light return 23a from the receiver optics 24 of FIG. 1 is applied to a beam splitter 80 which may be a partially reflecting mirror such as mirror 60 heretofore used if this is followed by optical band pass filters F-1 and F-2 for the two respective frequency or wavelength components used. In practice, however, it is preferred that the beam splitter used in the dual wavelength mode should be a dichroic mirror 80 which reflects all energy at the range wavelengths along a beam 23b and transmits all energy at the image wavelengths along a beam 23c. In order to further separate or differentiate between the two sets of wavelengths discussed above, an optical filter F-1 transmitting only those wavelengths in the wavelength band known to have been used for the c.w. image operation may be interposed between the dichroic mirror 80 and the image dissector 70 to which the transmitted beam 23c is applied. The image dissector 70 and its operation may be identical to that discussed in connection with FIG. 8 above or, in this second embodiment, a simple open aperture photomultiplier tube may be substituted. In such a case, the filters reduce noise and the range pulses can phase synchronize the CRT so that image dissector phase synchronizing is not essential.

The reflected range beam 23b is passed through an optical filter F-2 which transmits only those wavelengths in the wavelength band known to be in use for the ranging pulses and which is interposed in the path of the reflected beam from the dichroic mirror 80 to a photomultiplier 81. The photomultiplier 81 is similar to the photomultiplier 61 of FIG. 8, but is preferably chosen to have maximum sensitivity at the wavelength being used.

If this dual wavelength mode of operation is used in an operator selected target type of system wherein one or only a few range pulses per raster frame scan are to be transmitted, as has been discussed in connection with FIGS. 1 and 15, the output of photomultiplier 81 will unequivocally be the range return pulse which can be applied over line 26 to the range computer 18 to stop the counters. No false alarm circuit is required since abrupt variations in reflectivity which may affect amplitude enough to make a video return look like a range return will not affect the wavelength separation technique. The output of image dissector 70 may similarly be applied directly over line 27 to the cathode ray tube 17 as discussed above. Target selection may then be made by closing switch S-1 in line 17a and using a light pen in the manner indicated above.

In terrain contour mapping or obstacle avoidance systems types of applications, the feedback indicated by line 17a in FIG. 1 from the cathode ray tube 17 to the range pulse trigger control 13 is not used and S-1 is left open. Instead, the switch S-2 is closed to actuate the circuit of FIG. 14 to run counter circuit 140 the outputs from which is applied to the range pulser circuit 12 so that a predetermined number of trigger pulses will be generated during each scan in synchronism with the horizontal and vertical start scan pulses being supplied to the synchronizer 14 over line 52 on the scanner 15. This of course has the effect of firing a known number of pulses per frame scan during each frame to divide it into a predetermined number of equal increments. From the reasoning set forth above it follows that the correlated spatial coordinates to which these pulses are aimed at the instant of their firing are also known. The system thus defines a set of space-time coordinates. The reflectivity map imagery existing at the target actually struck by the ranging pulse fired simultaneously with the image c.w. returns with it and is being continuously displayed on the scene map of the cathode ray tube 17. That is to say, the instant of firing each range pulse as defined by ordinal count of the master oscillator clock 100 in synchronizer 14 is known to computer 18 by virtue of feedback pulses over line 28 which start a range counter. This time may, if necessary for any utilization computer program, be stored in memory banks of computer 18 together with or at address identified by the geographical coordinates within the scanned scene at which the pulse was aimed. The total time elapsed before the return of the first range pulse is also known by virtue of the received pulse on line 26. This return time and/or the computer range can similarly be stored in memory, modified by any desired computer processing or program, and/or displayed or utilized as may be required.

Even in applications where the system may be mounted on a moving vehicle such as an aircraft, the transit time of light will not affect the correlation between the range measurement information and information as to the coordinates in the image to which range was measured. The absolute value of range to a fixed scene or target will of course be changing as the craft moves (and may need to be adjusted to allow for known vehicle velocity) but enough unambiguous information has been measured to permit updating, continuously adjusting, or extrapolating range information in accordance with any desired conventional computer programming techniques. That is to say, the range values which may be computed by conventional digital computer means from the contents of the counters in the range computer 18 are the correct values of range existing between the system and the target or scene element being displayed at the instant of reflection from the scene and later observed on the map in display 17 since the pulse producing that particular element of the reflectivity map and the corresponding range pulse are reflected and returned simultaneously from the same scene element.

If one desires to use such a system not only for generating a display or printout of the computed values of range which may be stored in any convenient computer memory device in computer 18, but also to select any particular target or object in the scene map for range determination, it is only necessary to close switch S-2 in line 17b from CRT17 to computer 18 and adjust a pair of cursors on the scene map (or to apply a light pen to it) to indicate to the computer (by sampling and analog-to-digital converter circuitry similar to that shown in FIG. 15) the coordinates of the desired target. The signals from CRT17 representative of the selected target coordinates may then be used not, as in FIG. 15, to trigger a range pulse which must thereafter be fired at a target, but rather to enable the computer to read out of the correct address in memory storage the already computed range value from the continuing values of range being computed for the scene element at the selected coordinate or for the element nearest to it. Target and range are then already correlated before the observer makes his target selection and phase synchronization is simplified since the range read out is that to whatever target he sees as that range existed at the time the pulse struck the target. This, together with time elapsed since then, is also known by virtue of the continuously running clock 100. If desired, of course, appropriate interpolation programs may be used to get an exact value for any point between coordinates and appropriate extrapolation programs may be used to adjust this value for the continuing relative motion of target and system as time passes in real time on-line application.

It will thus be seen that in such a system the continuous wave laser output at the first wavelength is used to generate a reflectivity map of the scanned scene which is displayed on tube 17 in the manner discussed for both embodiments. At relatively closely spaced increments of time within each scan counters synchronized to the transmitter start-scan pulse cause a trigger pulse applied through trigger control 13 to the range pulser 12 and laser output, preferably of nanosecond duration, at the second wavelength results. The reflected laser return from each element of the scene is passed through the separator-detector circuit of FIG. 12. The image dissector or photomultiplier 70 provides the video signal (which is preferably first passed through the video restorer of FIG. 13) for the display on tube 17 and simultaneously but intermittently, the photomultiplier 81 supplies a stop count range pulse over line 26 to the range computer 18 and a video sweep phase signal over line 27 to CRT17. The resulting computed range may either be stored in a continuously updated memory bank having known sets of addresses for each element of the scanned scene and/or it may be used to generate a separate or a switch selectable mode of contour map display for presentation on a cathode ray tube. The operator looking at the reflectivity map on cathode ray tube 17 may notice a target of interest to him. If he uses cursors or a light pen and closes switch S-2, the coordinates of that target may be used to read out from the stored range values in the memory bank in computer 18 the range which existed from the observer to the target at the instant when the photons which generated the reflectivity map element being observed were reflected from the target. By conventional computer circuitry a continuing read out of continuously updated range values can be provided and modified as desired to account for known delays or errors (such as vehicle motion) since then. These continuing slant range values corresponding to known direction angles together with computed values of rate of change of range or other derived information may then be displayed or supplied for real time use by weapon delivery or other utilization systems.

What is claimed is:

1. In a scanned laser radar imaging system of the type utilizing a gas laser to generate an output of continuous wave radiant energy which is reflected from a scanned scene to produce an image thereof, the improvement comprising:
   a. first means to pulse said laser during predetermined discrete time intervals to vary a characteristic of said laser output during said discrete intervals to thereby produce output pulses distinguishable from said continuous wave output during said time intervals in terms of said varied characteristic;
   b. second means to separate said reflected radiant energy into first and second portions;
   c. third means to utilize said first portion of said reflected energy from said continuous wave output to produce said image of said scene; and
   d. fourth means to simultaneously utilize said second portion of said reflected energy from said output pulses of varied characteristic to determine the range to a predetermined portion of said imaged scene.

2. Apparatus as in claim 1 and further including means responsive to coincident reception of reflected energy from both said continuous wave output and said pulse output of said laser to enhance the fidelity of at least one of said utilization means.

3. Apparatus as in claim 1 and further including means responsive to reception of reflected energy from said pulse output of said laser to control the phase synchronization of said scene to produce said image.

4. Apparatus as in claim 1 wherein said varied characteristic of said laser output is its amplitude, said pulses having an amplitude which is distinguishably greater than that of the steady state amplitude of said continuous wave output.

5. In a scanned laser radar imaging system of the type utilizing a gas laser to generate an output of continuous wave radiant energy which is reflected from a scanned scene to produce an image thereof, the improvement comprising:
   a. first means to pulse said laser during predetermined discrete time intervals to vary a characteristic of said laser output during said discrete intervals to thereby produce output pulses distinguishable from said continuous wave output during said time intervals in terms of said varied characteristic;
   b. second means to separate said reflected radiant energy into first and second portions;
   c. third means to utilize said first portion of said reflected energy from said continuous wave output to produce said image of said scene; and
   d. fourth means to simultaneously utilize said second portion of said reflected energy from said output pulses of varied characteristic to determine the range to a predetermined portion of said imaged scene, said varied characteristic of said laser output being its wavelength, said continuous wave output being at a first wavelength and said pulse output being at a second wavelength which occurs only during said pulse and which is then separate and different from said first wavelength output coexisting therewith.

6. In a scanned laser radar imaging system of the type utilizing a gas laser to generate an output of continuous wave radiant energy which is reflected from a scanned scene to produce an image thereof, the improvement comprising:
   a. first means to pulse said laser during predetermined discrete time intervals to vary a characteristic of said laser output during said discrete intervals to thereby produce output pulses distinguishable from said continuous wave output during said time intervals in terms of said varied characteristic;
   b. second means to separate said reflected radiant energy into first and second portions;
   c. third means to utilize said first portion of said reflected energy from said continuous wave output to produce said image of said scene; and
   d. fourth means to simultaneously utilize said second portion of said reflected energy from said output pulses of varied characteristic to determine the range to a predetermined portion of said imaged scene, said predetermined portion of said imaged scene to which range is determined being an operator selected target and said apparatus including means to trigger said first pulsing means only at a time during each scan of said scene such that said pulse of varied characteristic is reflected from said target.

7. Apparatus as in claim 1 wherein said predetermined portion of said imaged scene to which range is determined is a plurality of incrementally separated elements of said scene positioned throughout each scan of said scene so as to provide samples of the contour of the terrain of the scene imaged and wherein said apparatus further includes means to automatically control the timing of said first pulsing means to produce a plurality of pulses during each scan of said scene to be reflected from said plurality of said contour sampled elements of said scene.

8. A scanned laser radar imaging system for simultaneously producing an image of a scanned scene and determining the range to a predetermined portion of said scene comprising:
   a. a laser operative to generate an output of continuous wave radiant energy, said laser comprising a gas laser having a continuous wave output at a first wavelength when operated at a first steady state level of power input and capable of simultaneously generating both said first wavelength output and a second output at a second wavelength when operated at a predetermined increased level of power input to said laser;

b. transmitter optics and scanner means operative to transmit said output and direct it onto a scene to be scanned in a predetermined timed scan pattern;

c. means to derive at least one time synchonization signal from said scanner means;

d. pulser means to vary a characteristic of said transmitted output of said continuous wave laser in pulses occurring at preselected times, said pulser comprising means operative to increase the power level of said input to said laser to said predetermined increased level to generate pulses at said second wavelength for transmission simultaneously with said continuous wave output at said first wavelength;

e. means to control said preselected times relatively to said synchronization signal;

f. receiver optics for receiving said laser generated energy which is reflected from said scanned scene;

g. receiver output processing means to process the output of said receiver optics to derive from it a first signal comprising an image signal which is a measure of the reflectivity of elements of said scanned scene as represented by the reflected continuous wave energy of said laser and a second signal comprising a range signal which affords a measure of the transit time of the energy relected from said predetermined portion of said image during said timed pulses, said receiver output processing means comprising a first optical path for selectively transmitting only energy at said first wavelength to first electro-optical transducer means for generating said first signal and a second optical path for selectively transmitting only energy at said second wavelength to a second electro-optical transducer for generating said second signal;

h. means responsive to said synchronization signal and to said first signal from said receiver output processing means for generating an image of said scanned scene; and i. counter means connected to measure the time elapsed between said preselected time of occurrence of a pulse of said transmitted output and the time of reception of said second signal from said receiver output processing means derived from the reflected energy of said pulse for computing the range from said transmitter to said predetermined portion of said scene.

9. Apparatus as in claim 8 wherein:

a. said means to control said preselected times of said output pulses comprises operator controlled means to select a visually predetermined target element of said image of said scanned scene and to generate a signal which is a measure of its position in said timed scan pattern; and b. means to utilize said second signal derived from said receiver output processing means to compute the range to said operator selected target element.

10. Apparatus as in claim 8 wherein:

a. said means to control said preselected times of output pulses comprises means to automatically generate a plurality of incrementally spaced pulser timing control signals during each scan of said scene, said pulser timing control signals being related to said timed scan pattern in a predetermined manner; and b. means to utilize said second signal derived from said receiver output processing means to compile a contour map of the terrain of said scanned scene by computing and storing a measure of the range to each of the elements of said scene illuminated by said pulsed output.

11. Apparatus as in claim 9 and further including means to modify said first image signal derived from said receiver output processing means only during reception of said second range signal derived therefrom, said first signal being modified in such a manner as to compensate for the distortion of the imaging of the reflectivity of said scene due to said increase in the power level of the input to said laser during said pulse.

12. In a scanned laser radar imaging system of the type utilizing a gas laser to generate an output of continuous wave radiant energy which is reflected from a scanned scene to display an image thereof:

a. means to utilize a portion of the output energy of said laser to determine the range to at least one element of said imaged scene simultaneously with the display of said image, said portion of the output energy being generated by means to pulse said continuous wave laser to produce during said pulse interval both said continuous wave output at a first wavelength and a pulse output at a second wavelength; and b. means to provide a readout of said range to a designated element of said scene.

13. In a scanned laser radar imaging system of the type utilizing a gas laser to generate an output of continuous wave radiant energy which is reflected from a scanned scene to display an image thereof:

a. means to utilize a portion of the output energy of said laser to determine the range to at least one element of said imaged scene simultaneously with the display of said image; and b. operator actuated means to provide a readout of said range to a designated element of said scene, said operator actuated means comprising means to fire a pulse of laser output energy at said designated element and means to compute the magnitude of said range from the transit time of the reflection of said pulse.

14. Apparatus as in claim 12 wherein said range readout means comprises means to compute and store values of range to a plurality of incrementally space elements of said scene and means to designate the image coordinates of one element of said scene for which said range readout is to be provided from a corresponding address in said plurality of stored values of range.

* * * * *